US011234280B2

(12) United States Patent
Pavlov et al.

(10) Patent No.: US 11,234,280 B2
(45) Date of Patent: Jan. 25, 2022

(54) METHOD FOR RF COMMUNICATION CONNECTION USING ELECTRONIC DEVICE AND USER TOUCH INPUT

(71) Applicant: Samsung Electronics Co., Ltd., Suwon-si (KR)

(72) Inventors: Konstantin Aleksandrovich Pavlov, Moscow (RU); Nikolay Nikolayevich Olyunin, Perm (RU); Andrey Vladimirovich Kletsov, Moscow (RU); Artem Yurievich Nikishov, Moscow Region (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 16/644,709

(22) PCT Filed: Nov. 28, 2018

(86) PCT No.: PCT/KR2018/014755
§ 371 (c)(1),
(2) Date: Mar. 5, 2020

(87) PCT Pub. No.: WO2019/107888
PCT Pub. Date: Jun. 6, 2019

(65) Prior Publication Data
US 2020/0288518 A1     Sep. 10, 2020

(30) Foreign Application Priority Data

Nov. 29, 2017  (RU) .......................... RU2017141592
Nov. 12, 2018  (KR) ........................ 10-2018-0138299

(51) Int. Cl.
*G06F 3/01* (2006.01)
*H04W 76/14* (2018.01)
(Continued)

(52) U.S. Cl.
CPC ....... *H04W 76/14* (2018.02); *H04M 1/72454* (2021.01); *H04W 4/80* (2018.02)

(58) Field of Classification Search
CPC combination set(s) only.
See application file for complete search history.

(56) References Cited

U.S. PATENT DOCUMENTS 7,664,476 B2   2/2010   Yanagida
8,036,595 B2   10/2011  Glass et al.
(Continued)

FOREIGN PATENT DOCUMENTS

EP   3 091 459 A1   11/2016
JP   5794782 B2     2/2011
(Continued)

OTHER PUBLICATIONS

Extended European Search Report dated Oct. 15, 2020, issued in European Patent Application No. 18882715.8.
(Continued)

*Primary Examiner* — Cindy Trandai
(74) *Attorney, Agent, or Firm* — Jefferson IP Law, LLP

(57) ABSTRACT

The present disclosure relates to an electronic device and a radio frequency (RF) communication connection method for the electronic device. A method of connecting an electronic device to an external device includes searching for at least one external device connectable with an electronic device within a preset communication range by using first short-range communication, determining an operation period of a second short-range communication module for performing second short-range communication with the at least one external device, based on a search result with respect to the at least one external device, activating the second short-range communication module according to the determined operation period and detecting a contact of a user of the (Continued)

electronic device with respect to an external device among the at least one external device by using the activated second short-range communication module, and receiving address information of the external device by performing second short-range communication with the external device, upon detecting the contact of the user.

15 Claims, 21 Drawing Sheets

(51) Int. Cl.
*H04W 4/80* (2018.01)
*H04M 1/72454* (2021.01)

(56) References Cited

U.S. PATENT DOCUMENTS

| | | | |
|---|---|---|---|
| 8,180,288 | B2 | 5/2012 | Hebiguchi et al. |
| 8,498,618 | B2 | 7/2013 | Ben Ayed |
| 8,527,016 | B2 | 9/2013 | Lee et al. |
| 8,666,313 | B2 | 3/2014 | Preston et al. |
| 8,671,235 | B2 | 3/2014 | Tung et al. |
| 9,000,914 | B2 | 4/2015 | Baker et al. |
| 9,008,658 | B2 | 4/2015 | Baker et al. |
| 9,179,245 | B1 | 11/2015 | Chan et al. |
| 9,253,633 | B2 | 2/2016 | Larmo et al. |
| 9,332,377 | B2 | 5/2016 | Agardh et al. |
| 9,386,924 | B2 | 7/2016 | Baker et al. |
| 9,438,332 | B2 | 9/2016 | Tian et al. |
| 9,566,383 | B2 | 2/2017 | Yodfat et al. |
| 9,579,023 | B2 | 2/2017 | Baker et al. |
| 9,646,300 | B1 | 5/2017 | Zhou et al. |
| 9,967,039 | B2 | 5/2018 | Kim et al. |
| 10,187,164 | B2 | 1/2019 | Kim et al. |
| 2009/0135886 | A1 | 5/2009 | Robertson et al. |
| 2011/0250837 | A1 | 10/2011 | Hwang et al. |
| 2011/0299512 | A1 | 12/2011 | Fukuda |
| 2013/0132166 | A1 | 5/2013 | Wu et al. |
| 2014/0025849 | A1 | 1/2014 | Deborgies |
| 2014/0256250 | A1 | 9/2014 | Cueto et al. |
| 2014/0342670 | A1* | 11/2014 | Kang .................. H04L 67/303 455/41.2 |
| 2015/0052264 | A1* | 2/2015 | Yuan .................... G06F 1/3278 710/2 |
| 2015/0162994 | A1 | 6/2015 | Rodzevski et al. |
| 2015/0163221 | A1 | 6/2015 | Bolin et al. |
| 2015/0253873 | A1* | 9/2015 | Sato .................... G09B 19/0038 345/156 |
| 2015/0350820 | A1* | 12/2015 | Son ...................... H04L 63/107 455/41.2 |
| 2015/0381830 | A1* | 12/2015 | Wu .................. H04N 21/43637 348/207.1 |
| 2016/0050516 | A1* | 2/2016 | Visweswara ......... H04B 13/005 455/41.2 |
| 2016/0109958 | A1 | 4/2016 | Moon |
| 2016/0127050 | A1 | 5/2016 | Antoine et al. |
| 2016/0150582 | A1* | 5/2016 | Jung ...................... H04W 4/70 455/41.1 |
| 2016/0203383 | A1* | 7/2016 | Itoh ........................ G06T 7/20 382/190 |
| 2016/0211925 | A1 | 7/2016 | Sydir et al. |
| 2016/0239823 | A1 | 8/2016 | Bengtsson et al. |
| 2016/0255589 | A1* | 9/2016 | Sato .................. H04W 52/0241 370/311 |
| 2016/0282979 | A1* | 9/2016 | Konanur .............. G06F 3/0446 |
| 2016/0286587 | A1 | 9/2016 | Astrand et al. |
| 2016/0330573 | A1 | 11/2016 | Masoud et al. |
| 2016/0380703 | A1 | 12/2016 | Konanur et al. |
| 2017/0042485 | A1* | 2/2017 | Chung ................. A61B 5/7285 |
| 2017/0064767 | A1* | 3/2017 | Sugiyama ............. H04W 76/19 |
| 2017/0076272 | A1 | 3/2017 | Zhou et al. |
| 2017/0093822 | A1 | 3/2017 | Gutierrez et al. |
| 2017/0244823 | A1* | 8/2017 | Kim .................. H04M 1/72412 |
| 2017/0272176 | A1 | 9/2017 | Konanur et al. |
| 2017/0281060 | A1* | 10/2017 | Wedekind ............ A61B 5/0022 |
| 2017/0289329 | A1* | 10/2017 | Yim ........................ G06F 3/048 |
| 2017/0312530 | A1* | 11/2017 | Schilling ............ A61N 1/37223 |
| 2017/0373762 | A1* | 12/2017 | Liu ...................... H04B 13/005 |
| 2018/0060529 | A1* | 3/2018 | Crothall ................ G16H 40/63 |
| 2018/0140192 | A1* | 5/2018 | Kubo ..................... G16H 40/63 |
| 2018/0295660 | A1* | 10/2018 | Choi ...................... H04W 76/14 |
| 2019/0029074 | A1* | 1/2019 | Inoue ..................... H04L 69/08 |
| 2019/0102759 | A1* | 4/2019 | Wade .................. G06Q 20/3226 |
| 2019/0116088 | A1* | 4/2019 | Mueglitz .............. A61B 5/0004 |
| 2019/0274556 | A1* | 9/2019 | Sun ....................... A61B 5/0024 |
| 2019/0327675 | A1* | 10/2019 | Takeuchi .............. H04W 76/14 |
| 2020/0280844 | A1* | 9/2020 | Mizota .............. H04M 1/72403 |

FOREIGN PATENT DOCUMENTS

| | | |
|---|---|---|
| JP | 2012-109861 A | 6/2012 |
| KR | 10-2009-0019504 A | 2/2009 |
| KR | 10-1633033 B1 | 6/2016 |
| KR | 10-2017-0041501 A | 4/2017 |
| KR | 10-2017-0073455 A | 6/2017 |
| KR | 10-1743635 B1 | 6/2017 |

OTHER PUBLICATIONS

International Search Report dated Mar. 19, 2019, issued in International Patent Application No. PCT/KR2018/014755.
Russian Search Report dated Jun. 14, 2018, issued in Russian Patent Application No. 2017141592.
Russian Decision on Grant dated Jun. 27, 2018, issued in Russian Patent Application No. 2017141592.
K.A. Pavlov et al., Application of the technique of wireless communication via the human body for special equipment, Jun. 2011.
Kado, AC Electric Field Communication for Human-Area Networking, IEICE Trans. Electron., vol. E93-C, No. 3, Mar. 2010.

* cited by examiner

METHOD FOR RF COMMUNICATION CONNECTION USING ELECTRONIC DEVICE AND USER TOUCH INPUT

TECHNICAL FIELD

The present disclosure relates to an electronic device and a radio frequency (RF) communication connection method for the electronic device. More specifically, the present disclosure relates to an RF communication connection method for an electronic device using human body communication (HBC).

BACKGROUND ART

There is a demand for development of a radio frequency (RF) communication technology for mutual control between electronic devices and/or control over electronic devices via other electronic devices. For example, an RF communication technology for mutual control between electronic devices may be used for mobile phones, smartphones, wireless head phones, glasses using virtual reality (VR)/augmented reality (AR), televisions, home appliances, and various sensor devices located in a smart house and to establish a city's infrastructure such as for transportation.

In particular, for fast and accurate RF communication connection, development of an RF communication connection technology including a technique for prompt and accurate target device identification, a technique for a stable communication channel, and a technique for low power consumption for RF communication is required. Moreover, various technologies for RF communication between electronic devices have been developed, and especially in relation to a human body communication (HBC) technology, technologies for a communication system and method using a part of a user body as a communication channel have been developed.

However, communication technologies using a general HBC module need a tunable element or a switchable element, increasing a size and a production cost of a communication device. RF technologies such as Bluetooth, Bluetooth Low Energy (BLE), ZigBee, 2.4 GHz Adaptive Network Topology (ANT)+, Wireless Fidelity (Wi-Fi), and Wi-Fi Direct, and an HBC technology have a limitation in that they are not associated with each other.

Moreover, a general HBC communication technology requires a plurality of identification and connection processes for connection between devices, and in particular, according to a state and a position in which an electronic device including an electrode of an HBC module is attached on a user's body, an impedance of the electrode changes, and according to the changing impedance of the electrode, a reliable channel is difficult to form through the user's body, and thus, stable data transmission and reception is not possible.

Furthermore, general HBC requires additional power consumption for achieving synchronization between electronic devices, solving collisions therebetween, and sensing HBC connection therebetween. Therefore, there is a need for development of a technique for overcoming limitations of a short-range RF communication technology and an HBC technology.

DESCRIPTION OF EMBODIMENTS

Technical Problem

Provided are an electronic device and a method for setting up radio frequency (RF) communication via user contact.

Solution to Problem

According to an embodiment of the present disclosure, a method includes searching for at least one external device connectable with an electronic device within a preset communication range by using first short-range communication, determining an operation period of a second short-range communication module for performing second short-range communication with the at least one external device, based on a search result with respect to the at least one external device, activating the second short-range communication module according to the determined operation period and detecting a contact of a user of the electronic device with respect to an external device among the at least one external device by using the activated second short-range communication module, and receiving address information of the external device by performing second short-range communication with the external device, upon detecting the contact of the user.

According to another embodiment of the present disclosure, an electronic device connected with an external device includes a first short-range communication module configured to perform first short-range communication with the external device, a second short-range communication module configured to perform second short-range communication with the external device, at least one memory storing one or more instructions, and at least one processor configured to execute the one or more instructions, in which the at least one processor, by executing the one or more instructions, may be configured to search for at least one external device connectable with the electronic device within a preset communication range by using the first short-range communication, to determine an operation period of the second short-range communication module for performing second short-range communication with the at least one external device, based on a search result with respect to the at least one external device, to activate the second short-range communication module according to the determined operation period and detect a contact of a user of the electronic device with respect to an external device among the at least one external device by using the activated second short-range communication module, and to receive address information of the external device by performing second short-range communication with the external device, upon detecting the contact of the user.

According to another embodiment of the present disclosure, a method includes searching, by an electronic device, for at least one connectable external device within a preset communication range by using first short-range communication, activating a second short-range communication module according to a first operation period when the electronic device and the at least one connectable external device find each other, forming a second short-range communication channel according to channel parameters determined based on a position of the electronic device on a body of a user and a distance from the electronic device to the body of the user, and exchanging a human body communication (HBC) signal through a second short-range communication channel to set up the first short-range communication between the electronic device and the at least one connectable external device.

Herein, the HBC signal may include address information for connection with the electronic device or the at least one external device, and the address information may further include a radio frequency (RF) communication identifier for setting up RF communication.

According to another disclosure of the present disclosure, when the electronic device first finds at least one connectable external device, the electronic device may receive an HBC signal including address information of the external device from the at least one connectable external device through the body of the user to set up the first short-range communication between the connectable external device and the electronic device.

When the at least one connectable external device first finds the electronic device, the HBC signal including the address information of the electronic device may be transmitted to the at least one connectable external device through the body of the user to set up the first short-range communication between the at least one connectable external device and the electronic device.

The second short-range communication module may be deactivated after receiving the HBC signal including the address information of the external device or transmitting the HBC signal including the address information of the electronic device, According to another embodiment, the method of connecting the electronic device to the external device may further include determining existence of a second short-range communication channel for generating and identifying the second short-range communication channel in response to the HBC signal including the address information.

The method of connecting the electronic device to the external device may further include determining a distance from the electronic device to the body of the user, in which the distance from the electronic device to the body of the user is less than or equal to a preset threshold value, the second short-range communication module may be activated to transmit and receive the HBC signal.

Herein, the method of connecting the electronic device to the external device may further include determining a distance from the electronic device to the connectable external device, in which the distance from the electronic device to the connectable external device does not exceed a preset threshold value, the second short-range communication module may be activated to transmit and receive the HBC signal.

The method of connecting the electronic device to the external device may further include detecting another external device from the at least one external device in a state where the first short-range communication is set up between the electronic device and one of the connectable external devices, and activating the second short-range communication module in the second operation period when the another external device is detected from the at least one external device.

Herein, the second operation period may be greater than the first operation period, the first operation period may be about 0.1% to about 20%, and the second operation period may be about 10% to about 50%.

Herein, the first short-range communication may include RF communication according to any one of short-range wireless communication standards.

According to another embodiment of the present disclosure, an electronic device connected with an external device includes a first short-range communication module configured to search for at least one connectable external device within a preset RF communication range and perform first short-range communication with the at least one connectable external device, at least one processor configured to process digital data for an HBC modulation unit, process digital data from an HBC demodulation unit, and set up the first short-range communication between the electronic device and the at least one external device, and a second short-range communication module configured to perform second short-range communication with the found at least one connectable external device.

The second short-range communication module may include an electrode module, which includes a first electrode and a second electrode for transmission and reception of the HBC signal through the second short-range communication channel, an HBC modulation unit configured to convert digital data of the processor into an HBC signal, an HBC channel stability circuit configured to specify HBC channel parameters according to a position of the electronic device on the body of the user and the distance from the electronic device to the body of the user, and an HBC demodulation unit configured to convert the HBC signal received from the at least one connectable external device into digital data and transmit the digital data to the processor.

When the electronic device and the at least one external device connectable with the electronic device find each other, the at least one processor may activate the first short-range communication module in the first operation period. The operation period may be a rate of an on time with respect to an off time of the second short-range communication module (e.g., a rate of an active state with respect to an inactive state of the second short-range communication module), and the HBC signal may include address information included in digital data processed by the at least one processor.

Herein, the address information may include an RF communication identifier.

Herein, when the electronic device finds the at least one connectable external device, the second short-range communication module may receive the HBC signal including address information transmitted from the at least one connectable external device through the body of the user of the electronic device to set up the first short-range communication with the at least one connectable external device.

When the at least one connectable external device first finds the electronic device, the second short-range communication module may transmit the HBC signal including the address information of the electronic device to the at least one connectable external device through the body of the user to set up the first short-range communication between the at least one connectable external device and the electronic device.

The second short-range communication module may be deactivated after transmission or reception of the HBC signal including the address information.

The second short-range communication module may generate a second short-range communication channel generation signal for identifying and generating the second short-range communication channel between the electronic device and the at least one connectable external device and transmit the second short-range communication channel generation signal to the at least one connectable external device.

The second short-range communication module may further include a user body proximity sensor for determining a distance from the electronic device to the user's body, in which when the distance from the electronic device to the user's body, determined using the user body proximity sensor, is less than or equal to a preset threshold value, the second short-range communication module may be activated to transmit and receive the HBC signal including the address information.

The first short-range communication module may determine the distance from the electronic device to the connectable external device based on the strength of the received signal, and activate the second short-range communication module to transmit and receive the HBC signal when the determined distance from the electronic device and the connectable external device is less than or equal to the preset threshold value.

A strength of the received signal may include a received signal strength indicator (RSSI).

In a state where the first short-range communication is set up between the electronic device and one of the at least one connectable external device, when the first short-range communication module detects another one of at least one connectable external device not registered in the electronic device, the processor may activate the second short-range communication module in the second operation period and transmit and receive the HBC signal in the second operation period by using the activated second short-range communication module.

Herein, the second operation period may be greater than the first operation period.

Herein, the first operation period may be set to about 0.1% to about 20% and the second operation period may be set to about 10% to about 50%, without being limited thereto.

Herein, the first short-range communication may perform first short-range communication (e.g., RF communication) according to any one of short-range wireless communication standards.

Advantageous Effects of Disclosure

A device connected to an external device according to the present disclosure may set up RF communication by using an HBC channel formed by a contact of a user.

BEST MODE

Figure 1:
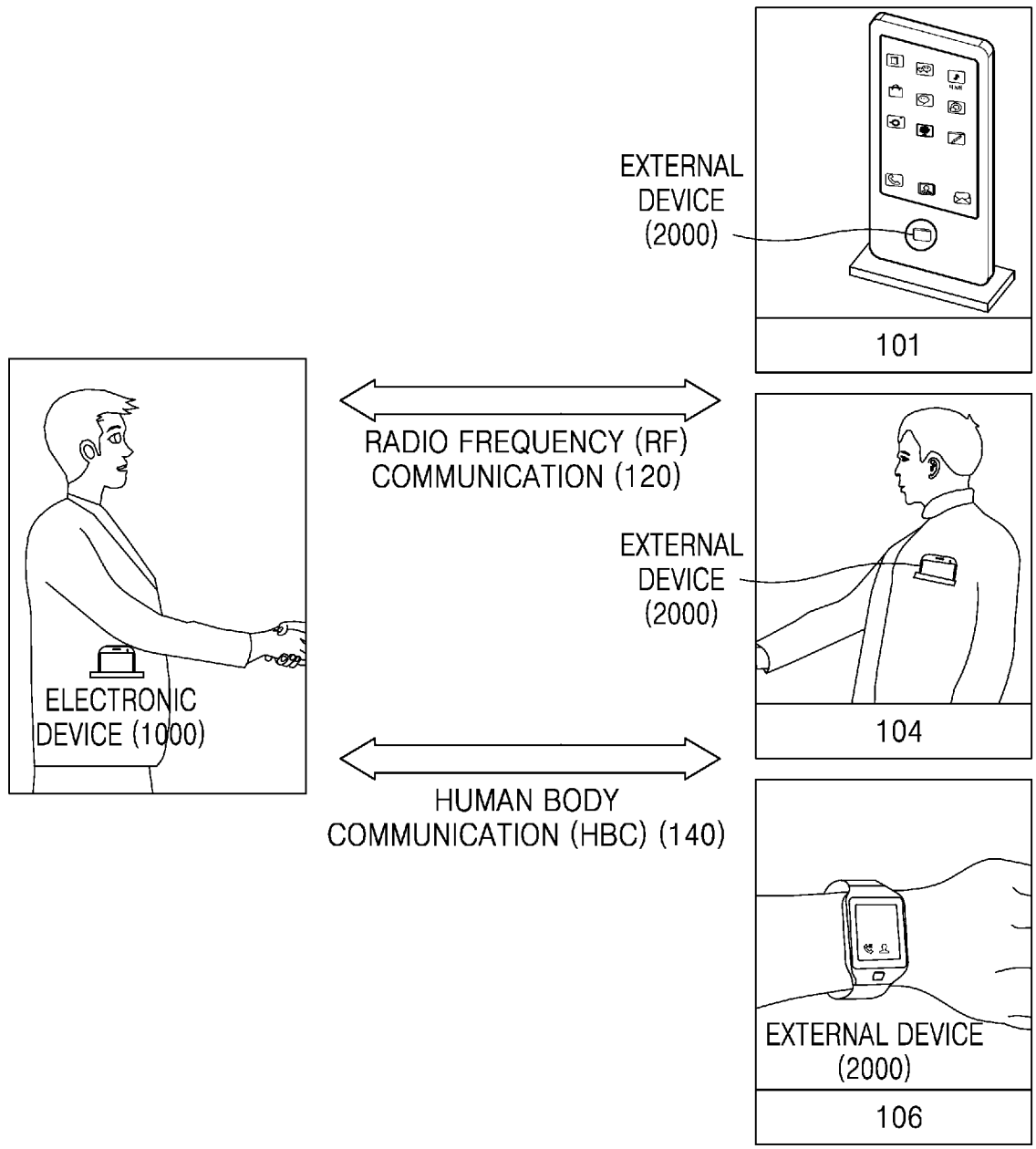
FIG. 1 schematically illustrates an example of external devices connectable with an electronic device attached onto a user's body when the electronic device is attached onto the user's body, according to an embodiment.

A method according to an embodiment includes searching for at least one external device connectable with an electronic device within a preset communication range by using first short-range communication, determining an operation period of a second short-range communication module for performing second short-range communication with the at least one external device, based on a search result with respect to the at least one external device, activating the second short-range communication module according to the determined operation period and detecting a contact of a user of the electronic device with respect to an external device among the at least one external device by using the activated second short-range communication module, and receiving address information of the external device by performing second short-range communication with the external device, upon detecting the contact of the user.

An electronic device connected with an external device according to an embodiment includes a first short-range communication module configured to perform first short-range communication with the external device, a second short-range communication module configured to perform second short-range communication with the external device, at least one memory storing one or more instructions, and at least one processor configured to execute the one or more instructions, in which the at least one processor, by executing the one or more instructions, may be configured to search for at least one external device connectable with the electronic device within a preset communication range by using the first short-range communication, to determine an operation period of the second short-range communication module for performing second short-range communication with the at least one external device, based on a search result with respect to the at least one external device, to activate the second short-range communication module according to the determined operation period and detect a contact of a user of the electronic device with respect to an external device among the at least one external device by using the activated second short-range communication module, and to receive address information of the external device by performing second short-range communication with the external device, upon detecting the contact of the user.

MODE OF DISCLOSURE

Terms used herein will be described in brief, and the disclosure will be described in detail.

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the present disclosure should be defined not by the simple names of the terms but by the meaning of the terms and the contents throughout the present disclosure.

Throughout the entirety of the specification of the disclosure, if it is assumed that a certain part includes a certain component, the term 'including' means that a corresponding component may further include other components unless a specific meaning opposed to the corresponding component is written. The term used in the embodiments of the disclosure such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments. However, the disclosure may be implemented in various forms, and are not limited to the embodiments described herein. To clearly describe the disclosure, parts that are not associated with the description have been omitted from the drawings, and throughout the specification, identical reference numerals refer to identical parts.

FIG. 1 schematically illustrates an example of external devices connectable with an electronic device attached on a user's body when the electronic device is attached on the user's body, according to an embodiment.

According to an embodiment, an electronic device 1000 according to the present disclosure may be connected with an external device 2000 by using at least one of first short-range communication and second short-range communication. Herein, connection between the electronic device 1000 and the external device 2000 may mean data transmission and reception using a communication channel.

For example, the electronic device 1000 according to the present disclosure may be connected with the external device 2000 by using at least one of first short-range communication and second short-range communication. Herein, first short-range communication may be radio frequency (RF) communication and may include at least one of Bluetooth, Bluetooth Low Energy (BLE), ZigBee, 2.4 GHz Adaptive Network Topology (ANT)+, Wireless Fidelity (Wi-Fi), or Wi-Fi Direct, and second short-range communication may include human body communication (HBC).

The HBC described herein may include communication using a user's body as at least a part of the communication channel. According to an embodiment, herein, first short-range communication may include communication schemes performed based on short-range communication standards and arbitrary communication standard technologies as well as the above-described communication methods, and the foregoing communication technologies are well known in a technical field, and thus will not be described in detail.

According to an embodiment, the electronic device 1000 according to the present disclosure may search for at least one external device 2000 connectable with the electronic device 1000, receive address information for setting up first short-range communication by using a second short-range communication module upon detection of a user contact to touch one of the found at least one external device 2000, and set up first short-range communication with the external device 2000 by using the received address information.

According to an embodiment, the address information may include at least one of pairing information or an RF communication identifier to set up first short-range communication between the electronic device 1000 and the at least one external device 2000. For example, the pairing information and the RF communication identifier according to the present disclosure may indicate at least one of information required for registration of the external device 2000 in the electronic device 1000 and information required for registration of the electronic device 1000 in the external device 2000 to set up first short-range communication between the electronic device 1000 and the external device 2000. According to an embodiment, the address information may be expressed as a unique sequence having a 48-bit length.

According to an embodiment, when the electronic device 1000 is worn on a part of the user's body, by using a user input to touch one of at least one external devices 2000 connectable with the electronic device 1000, the electronic device 1000 may set up first short-range communication with the external device.

According to an example 102, when a user carrying the electronic device 1000 touches a kiosk on which various information panels are displayed, the electronic device 1000 may set up first short-range communication with the external device 2000 included in the kiosk.

According to another example 104, when the user carrying the electronic device 1000 touches another user carrying the external device 2000, the electronic device 1000 may set up first short-range communication with the external device 2000 carried by the another user.

According to another example 106, when the user wearing the external device 2000 on a user's wrist, the electronic device 1000 may set up first short-range communication with the external device 2000 carried by the user. Herein, when the electronic device 1000 or the external device 2000 is worn on the user's body, it may include both a case where the electronic device 1000 or the external device 2000 is worn through direct contact with the user's body and a case where it is worn through indirect contact with the user's body (e.g., a user input to contact a part spaced apart from the electronic device by a predetermined distance such as existence of clothing of the user between the electronic device and the external device).

Figure 2:
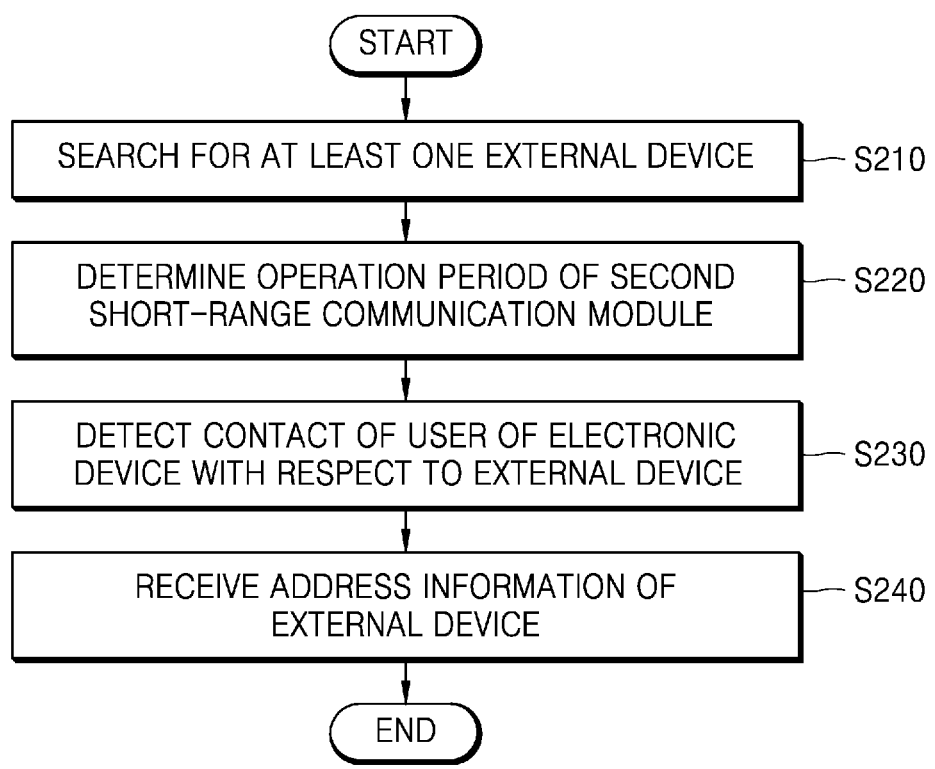
FIG. 2 is a flowchart of a method for connecting an electronic device to an external device, according to an embodiment.

FIG. 2 is a flowchart of a method for connecting an electronic device to an external device, according to an embodiment.

In operation S210, the electronic device 1000 may search for at least one external device connectable to the electronic device 1000. For example, the electronic device 1000 may search for at least one external device connectable with the electronic device within a preset communication range by using first short-range communication. According to an embodiment, the electronic device 1000 according to the present disclosure may search for external devices connectable with the electronic device 1000 by using Bluetooth.

In operation S220, the electronic device 1000 may determine an operation period of the second short-range communication module. For example, the electronic device 1000 may determine the operation period of the second short-range communication module for performing second short-range communication with at least one external device, based on a search result with respect to the at least one external device. The operation period described herein may indicate a ratio of an active state of the second short-range communication module to an inactive state thereof. According to another embodiment, the operation period according to the present disclosure may indicate a ratio of an on time of the second short-range communication module with respect to an off time thereof.

According to an embodiment, when the electronic device 1000 has not found any external device connectable with the electronic device 1000 as a result of searching for the external electronic devices connectable with the electronic device 1000 by using first short-range communication, the electronic device 1000 may maintain the second short-range communication module in the inactive state. That is, when the electronic device 1000 has not found any external device connectable with the electronic device 1000 as a result of searching for the external electronic devices connectable with the electronic device 1000 by using first short-range communication, the electronic device 1000 may set the operation period of the second short-range communication module to 0.

According to another embodiment, when the electronic device 1000 has found external devices connectable with the electronic device 1000 as a result of searching for the external electronic devices connectable with the electronic device 1000 by using first short-range communication, the electronic device 1000 may activate the second short-range communication module in a first operation period. According to another embodiment, when the electronic device 1000 has found at least one external device connectable with the electronic device 1000 by using first short-range communication and the found at least one external device is an external device previously registered in the electronic device 1000, the electronic device 1000 may activate the second short-range communication module in the first operation period. Herein, the first operation period may be, but not limited to, about 0.5% (on time/off time).

According to another embodiment, when the electronic device 1000 has found at least one external device connectable with the electronic device 1000 by using first short-range communication and the found at least one external device is an external device that is not registered in the electronic device 1000, the electronic device 1000 may activate the second short-range communication module in a second operation period. Herein, the second operation period may be, but not limited to, about 2%.

In operation S230, the electronic device 1000 may activate the second short-range communication module according to the determined operation period, and detect a contact of the user of the electronic device 1000 with respect to one of the at least one external device. For example, the electronic device 1000 may determine whether a channel for second short-range communication is formed between the electronic device 1000 and the external device 2000 by using the second short-range communication module, and may detect a user's contact with respect to the external device based on whether the channel for the second short-range communication is formed.

According to another embodiment, the electronic device 1000 may further include a user proximity sensor capable of detecting a user's contact, and may detect a user's contact with respect to the electronic device 1000 or the external device 2000 by using the user proximity sensor. Herein, the proximity sensor may include an arbitrary proximity sensor based on at least one of operating principles such as electromagnetism (capacitive, inductive, microwaves), optics (reflection, a pyrometer), ultrasonic waves, etc.

In operation S240, the electronic device 1000 may receive address information of an external device from the external device upon detection of the user's touch. For example, the electronic device 1000 may receive the address information of the external device by performing second short-range communication with the external device, upon detecting the user's contact. According to an embodiment, the address information may include pairing information or an RF communication identifier as information for setting up first short-range communication between the external device 2000 and the electronic device 1000.

According to another embodiment, although not shown in FIG. 2, in operation S240, the electronic device 1000 may form a second short-range communication channel according to a channel parameter determined based on at least one of a position of the electronic device on the body of the user of the electronic device or a distance between the electronic device and the user's body. That is, the electronic device 1000 may from the second short-range communication channel between the electronic device and the external device upon detecting a contact of the user of the electronic device with respect to one of the found at least one external device, and receive the address information from the external device through the formed second short-range communication channel.

According to another embodiment, the electronic device 1000 may transmit a second short-range communication channel generation signal for forming the second short-range communication channel to the external device 2000 connectable with the electronic device 1000 upon detecting the contact by the user of the electronic device 1000 with respect to one of the found at least one external device, and from the second short-range communication channel by receiving a second short-range communication channel response signal in response to the transmitted second short-range communication channel generation signal.

Although not shown in FIG. 2, in succession to operation S240, the electronic device 1000 may perform the pairing process with the external device by using the received address information and transmit and receive data upon completion of the pairing process between the electronic device 1000 and the external device. According to another embodiment, after the electronic device 1000 according to the present disclosure sets up first short-range communication with the external device, the electronic device 1000 may continuously search for another external device that is different from the external device with which first short-range communication is set up. When the electronic device 1000 sets up second short-range communication with another external device that is different from the external device with which first short-range communication is set up after the electronic device 1000 sets up first short-range communication with the external device, the operation period of the second short-range communication module may be set differently.

Figure 3:
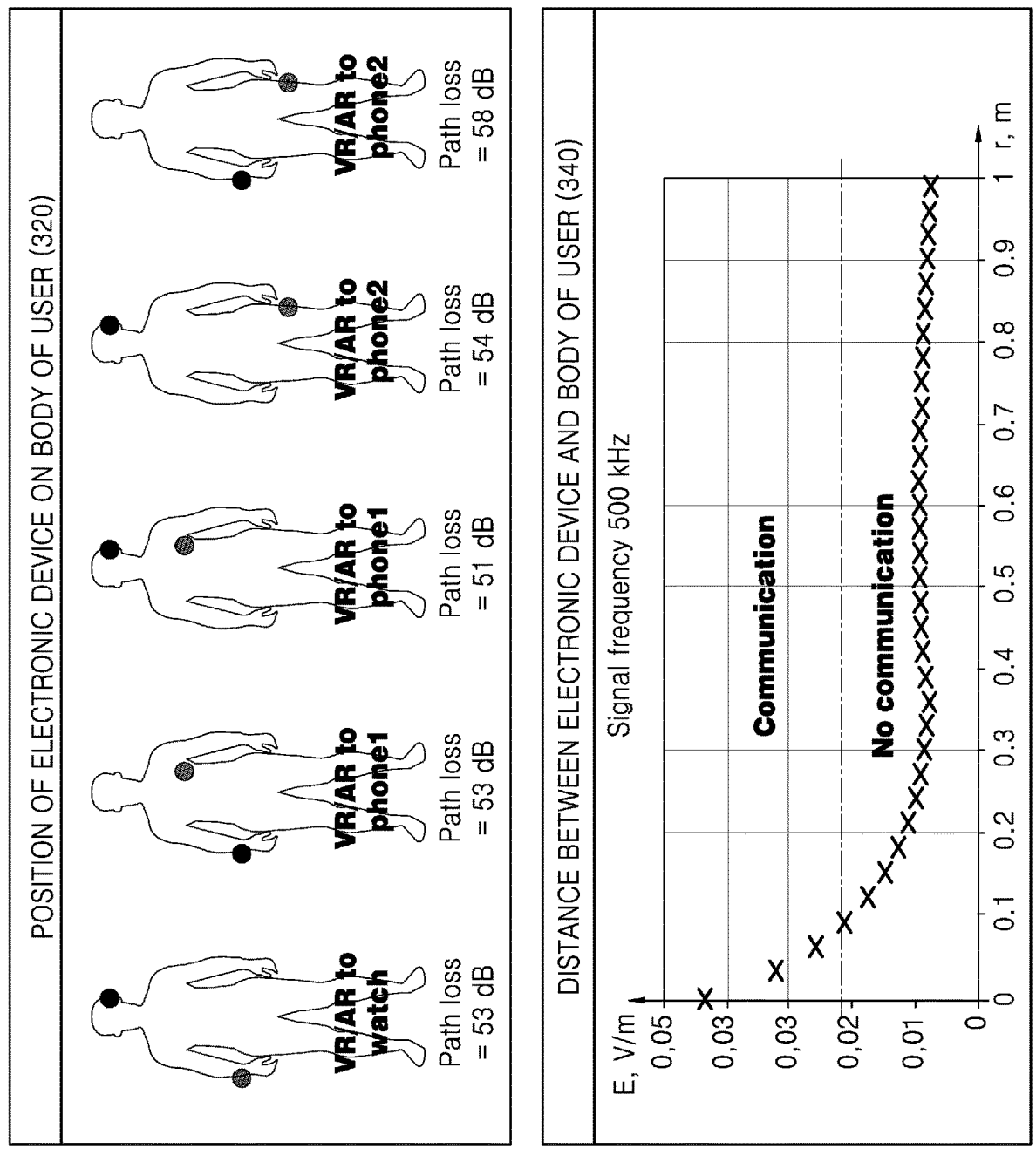
FIG. 3 illustrates a criterion for determining a channel parameter of a second short-range communication channel, according to an embodiment.

FIG. 3 illustrates a criterion for determining a channel parameter of a second short-range communication channel, according to an embodiment.

The second short-range communication channel used by the electronic device 1000 according to the present disclosure may be specified according to a channel parameter, and the channel parameter specifying the second short-range communication channel may be determined based on at least one of the position on the body of the user of the electronic device or the distance between the electronic device and the user's body.

According to an embodiment, second short-range communication may include HBC, such that a description will be made, as an example, of a case where second short-range communication is HBC and the second short-range communication channel is an HBC channel. HBC uses the user's body as at least a part of a communication channel, and the HBC channel in which an HBC signal for HBC may have characteristics that change with at least one of a position on the user's body in which the electronic device is attached or a distance between the user's body and the electronic device performing HBC.

For example, the HBC channel may be specified by a channel parameter indicating channel characteristics, and the channel parameter may be determined based on at least one of a position 320 on a user's body in which the electronic device is attached or a distance 340 between the electronic device performing HBC and the user's body. Referring to FIG. 3, when an electronic device (e.g., virtual reality (VR)/augmented reality (AR)) capable of performing HBC and an external device (e.g., a wrist watch or mobile) connected with the electronic device and is capable of performing HBC are located in the same user's body, a path loss of an HBC channel may change with the positions of the electronic device 1000 and the external device 2000.

According to another embodiment, the channel parameter for specifying the HBC channel may be determined based on the distance between the electronic device and the user's body. Referring to FIG. 3, when the frequency of the HBC signal for HBC is 500 KHz, the strength of an electric field of a signal transmitted and received to and from the electronic device may be reduced as the distance between the electronic device and the user's body increases. According to another embodiment, the channel parameter for specifying the HBC channel may be determined based on at least one of the size of the electrode included in the HBC module or absence or existence of an object having conductivity around the electronic device capable of performing HBC.

That is, the second short-range communication channel according to the present disclosure may be determined based on at least one of the position of the electronic device on the user's body, the distance between the electronic device and the user's body, the size of the electrode included in the second short-range communication module, or absence or existence of an object having conductivity around the electronic device capable of performing HBC. For stable HBC of the electronic device 1000 according to the present disclosure, it is necessary to design a channel parameter being affected a little by the distance between the electronic device and the user's body, the size of the electrode included in the second short-range communication module, or absence or existence of an object having conductivity around the electronic device capable of performing HBC.

Figure 4:
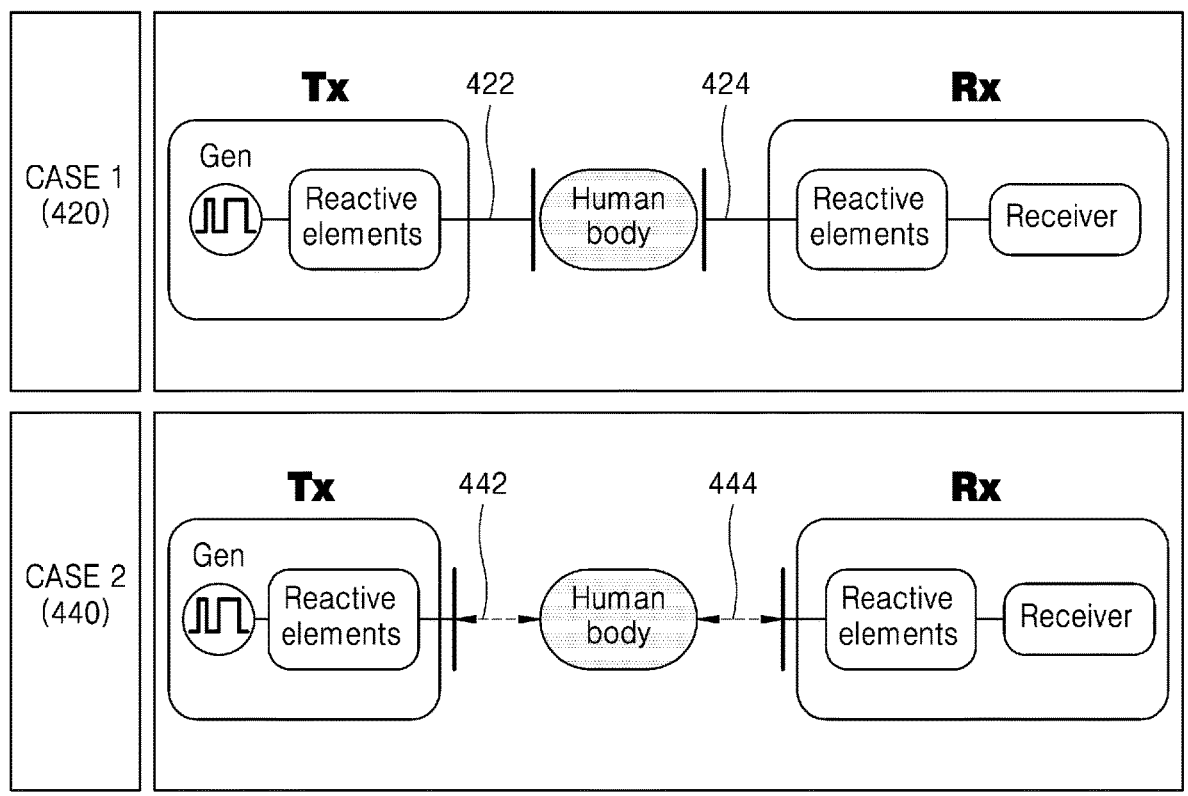
FIG. 4 is a diagram for describing a state in which an electronic device and an external device are attached to a user of the electronic device and a user of the external device, respectively, according to the present disclosure.

FIG. 4 is a diagram for describing a state in which an electronic device and an external device are attached to a user of the electronic device and a user of the external device, respectively, according to the present disclosure.

A connection state between the electronic device 1000 and the external device 2000 described herein may be roughly described as Case 1 420 where both the electronic device and the external device are attached to the user's body and Case 2 440 where none of the electronic device and the external device is attached to the user's body.

According to an embodiment, the electronic device, the external device connected with the electronic device, and the user's body may be modeled into the two-port network. Hereinbelow, a description will be made of an input impedance, a voltage transmission coefficient, an input power, and an output voltage by using a two-port network model including an electronic device, an external device connected with the electronic device, and a user's body by dividing cases into Case 1 420 where both the electronic device and the external device are attached to the user's body and Case 2 440 where none of the electronic device and the external device is attached to the user's body.

Figure 5:
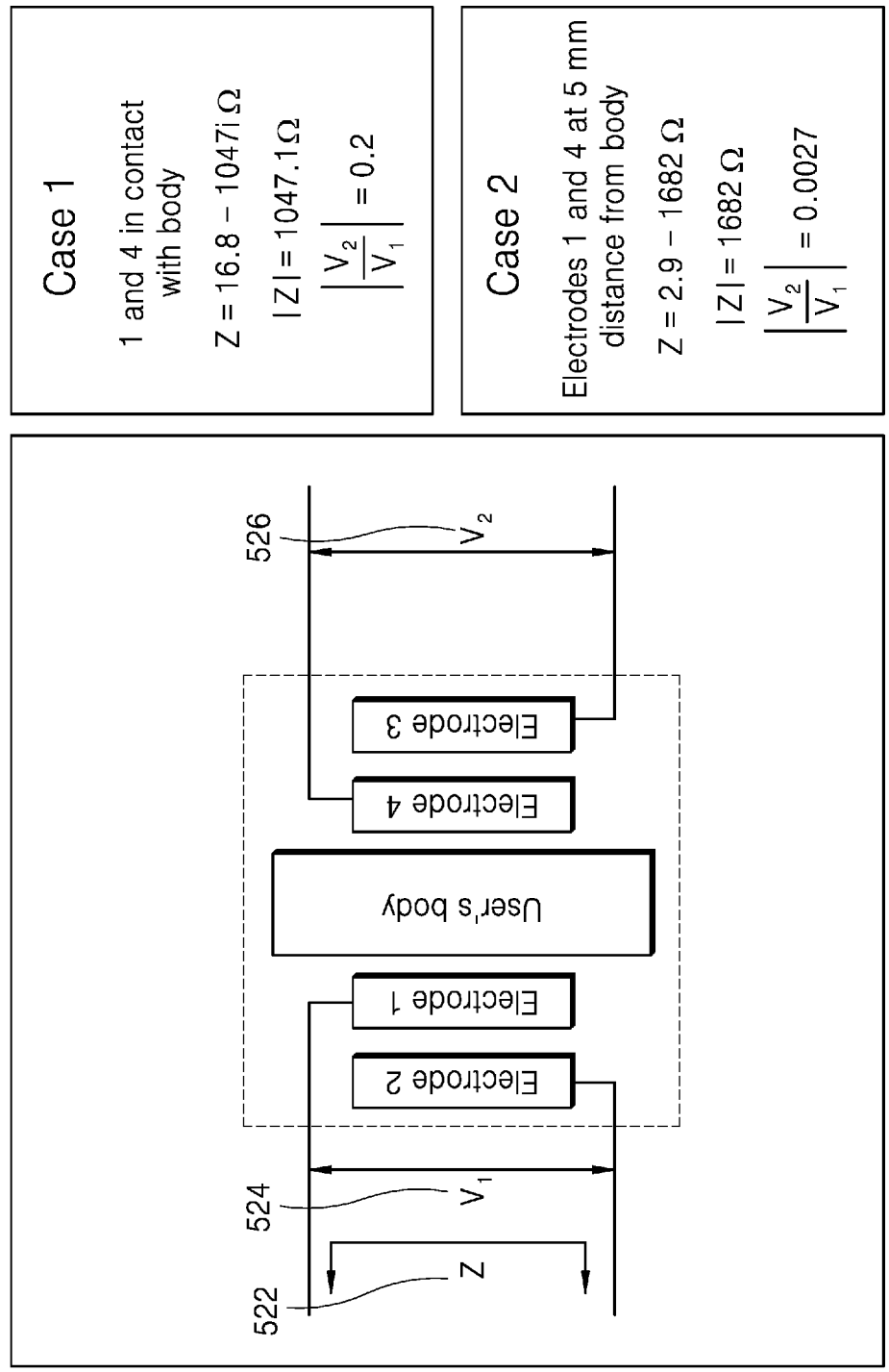
FIG. 5 is a diagram for describing an input impedance and a voltage transmission coefficient that change with attachment states of a general electronic device and an external device.

FIG. 5 is a diagram for describing an input impedance and a voltage transmission coefficient that change with attachment states of general electronic device and external device.

The electronic device including a general HBC module, the external device, and the user's body may be modeled into the two-port network. Let an input impedance 522 viewed from the electronic device including the general HBC module be Z, an input voltage viewed in the same direction be $V_1$ 524, and an output voltage viewed from the other side be $V_2$ 526. When both the electronic device including the general HBC module and the external device are attached to the user's body (Case 1 420), the input impedance may be measured as about 16.8-1047i ohm, the input impedance may be about 1047.1 ohm, and the voltage transmission coefficient (output voltage/input voltage) may be measured as about 0.2.

However, when none of the electronic device including the general HBC module and the external device is attached to the user's body (Case 2 440), the input impedance may be measured as about 2.9-1682i ohm, the input impedance may be about 1682 ohm, and the voltage transmission coefficient (output voltage/input voltage) may be about 0.0027. That is, when none of the electronic device including the general HBC module and the external device is attached to the user's body (Case 2 440), a voltage transmission rate is lowered and the input impedance increases, making stable transmission and reception of the HBC signal difficult.

Figure 6:
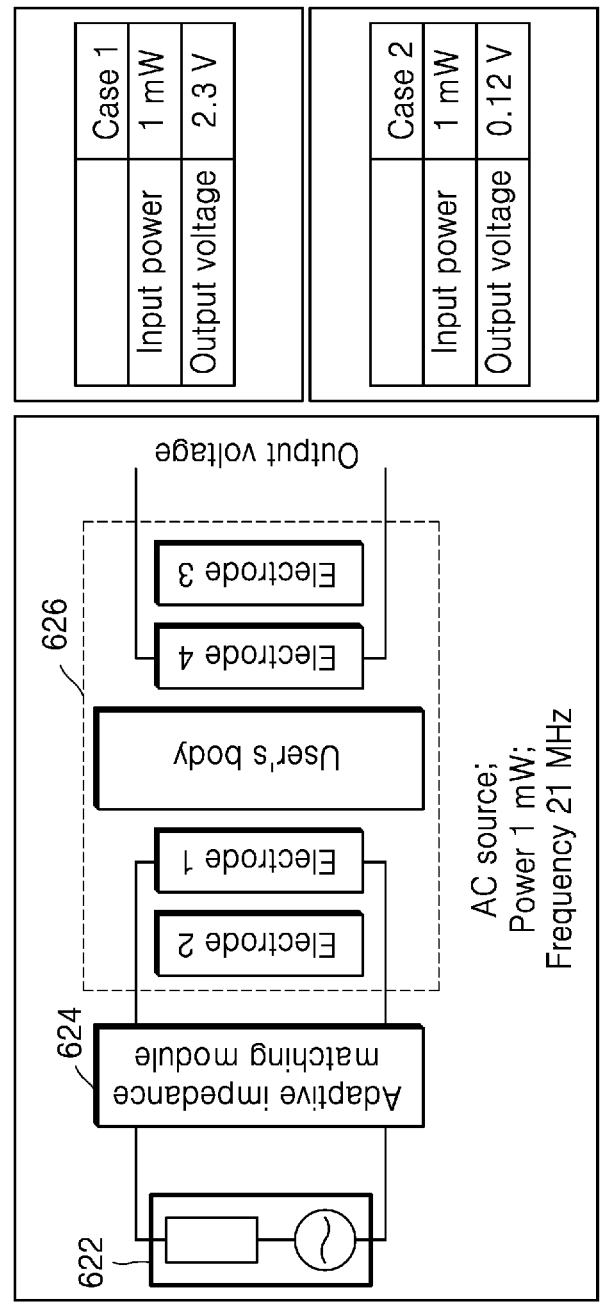
FIG. 6 is a diagram for describing an input power and an output voltage that change with attachment states of a general electronic device and an external device when the electronic device includes an electrode impedance matching module.

FIG. 6 is a diagram for describing an input power and an output voltage that change with attachment states of general electronic device and external device when the electronic device includes an electrode impedance matching module.

A general electronic device that does not use a channel stability circuit including an inductive reactance element and a bridge type driving circuit according to the present disclosure may include an adaptive impedance matching circuit 624 to perform stable HBC. For example, an input power and an output voltage will be described by modeling the electronic device that does not include a general HBC module, the external device, and the user's body into the two-port network. The input power generated in an alternating current (AC) power source of the electronic device including the general HBC module and delivered to the external device may be set to 1 Mw, and a frequency of a signal generated in the AC power source may be set to 21 MHz.

When both of the electronic device including the general HBC module and the external device are attached to the user's body (Case 1 420), the input power may be measured as 1 Mw and an output voltage may be measured as 2.3V. However, when none of the electronic device including the general HBC module and the external device is attached to the user's body (Case 2 440), the output voltage may be measured as 0.12V in spite of the same input power of 1 Mw. That is, when none of the electronic device including the general HBC module and the external device is attached to the user's body (Case 2 440), the output voltage versus the input power is low, making stable data transmission and reception difficult.

Figure 7:
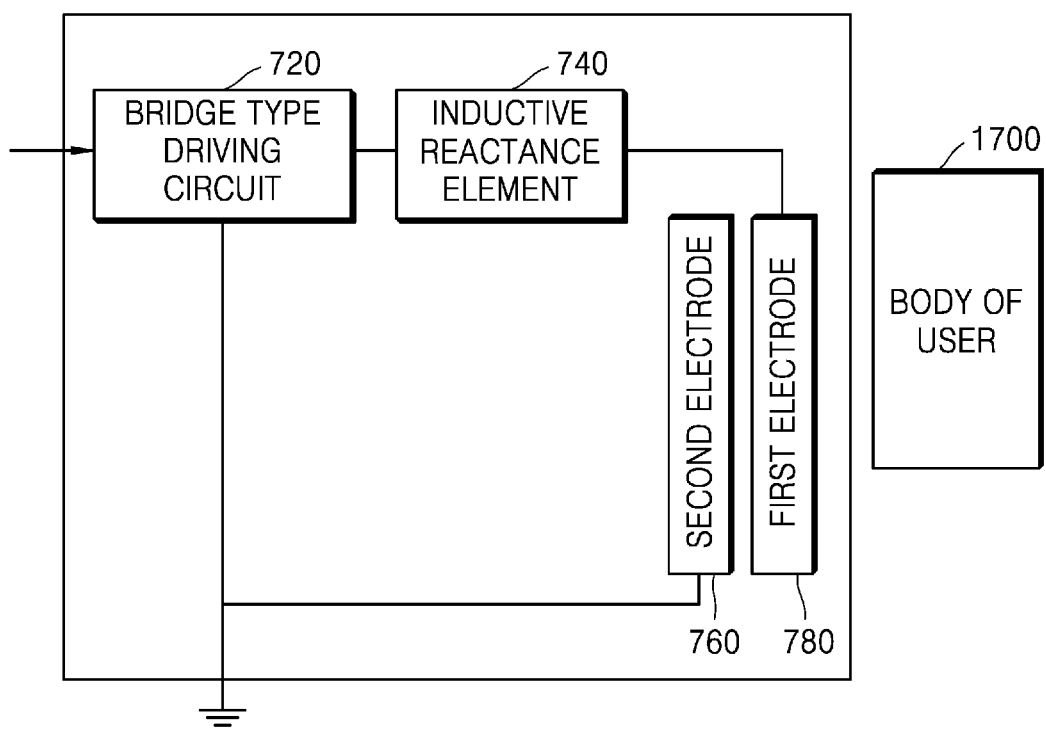
FIG. 7 is a diagram for describing a structure of a second short-range communication module used by an electronic device according to an embodiment.

FIG. 7 is a diagram for describing a structure of a second short-range communication module used by an electronic device according to an embodiment.

Second short-range communication according to the present disclosure may include HBC, and thus HBC will be described as an example thereof. The second short-range communication module according to the present disclosure may include a bridge type driving circuit 720, an inductive reactance element 740, a first electrode 780, and a second electrode 760. The second short-range communication module according to the present disclosure includes the bridge type driving circuit 720 and the inductive reactance element 740, thus performing stable second short-range communication.

As described above, channel stability of an HBC channel for HBC may vary with at least one of the position 320 on a user's body in which the electronic device is attached, the distance 340 between the electronic device performing HBC and the user's body, a size of an electrode in the HBC module, or existence or absence of a conductive object near the HBC module. That is, a channel parameter for specifying of an HBC channel may also vary with at least one of the position 320 on a user's body in which the electronic device is attached, the distance 340 between the electronic device performing HBC and the user's body, the size of the electrode in the HBC module, or existence or absence of a conductive object near the HBC module.

When the channel parameter changes with attachment states of the electronic device and the external device, stable communication may be difficult, requiring designing of the channel parameter being affected less by the attachment states of the electronic device and the external device. The second short-range communication module according to the present disclosure includes the bridge type driving circuit 720 and the inductive reactance element 740, such that the second short-range communication module may be resistive against the position 320 on a user's body in which the electronic device is attached, the distance 340 between the electronic device performing HBC and the user's body, the size of the electrode in the HBC module, or existence or absence of a conductive object near the HBC module.

Moreover, when none of the electronic device including the general HBC module and the external device is attached to the user's body (Case 2 440), on a virtual circuit including the electronic device, the external device, and the user's body, the input impedance may increase and the output voltage may decrease, making stable HBC signal transmission and reception difficult. However, the bridge type driving circuit 720 included in the second short-range communication module according to the present disclosure may be resistive with respect to an increasing input impedance, and the inductive reactance element 740 may increase the output voltage by reducing the input impedance, allowing the electronic device 1000 to perform stable second short-range communication (e.g., HBC). The functions of the first electrode 780 and the second electrode 760 according to the present disclosure will be described in detail with reference to FIG. 14.

Figure 8:
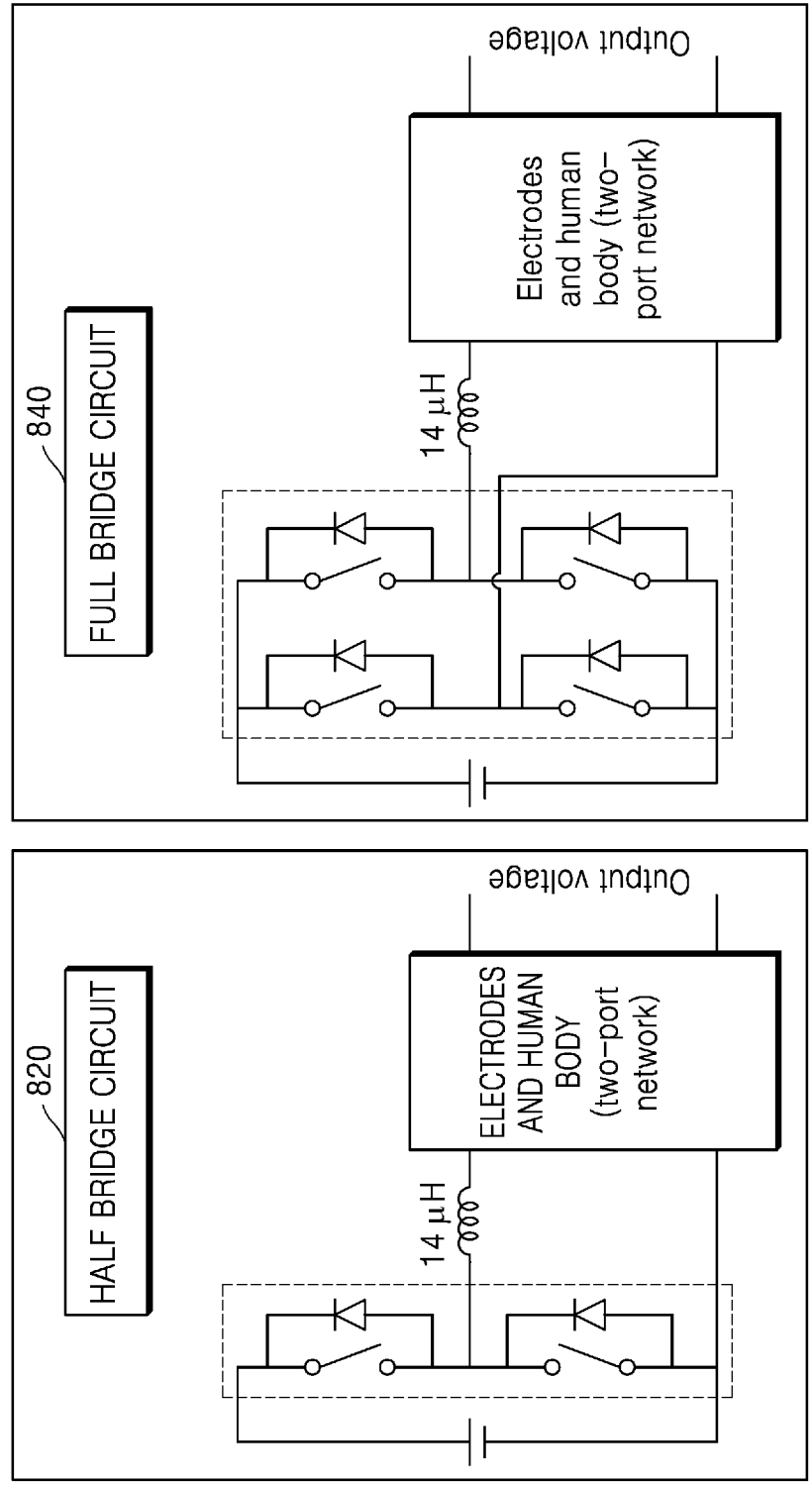
FIG. 8 is a diagram for describing a bridge type driving circuit structure in a second short-range communication module, according to an embodiment.

FIG. 8 is a diagram for describing a bridge type driving circuit structure in a second short-range communication module, according to an embodiment.

The bridge type driving circuit 720 included in the second short-range communication module according to the present disclosure may include a half bridge circuit 820 and a full bridge circuit 840. According to an embodiment, the half bridge circuit 820 may need an input voltage that is two times greater than the full bridge circuit 840 and less switching elements than the full bridge circuit 840. The bridge type driving circuit 720 according to the present disclosure may include at least one conductive leg and switching element. According to an embodiment, a switching element may include at least one transistor and at least one diode that are driven by a driving gate voltage.

For example, the bridge type driving circuit 720 according to the present disclosure may be connected at a side serially with a communication device that delivers data to the electronic device 1000 and at the other side with the inductive reactance element 740, thus compensating for a path of the second short-range communication channel when none of the electronic device and the external device is attached to the user's body (Case 2 440). The electronic device 1000 according to the present disclosure may select at least one of the half bridge circuit 820 or the full bridge circuit 840, taking account of an input voltage viewed from the electronic device 1000 and an output voltage viewed from the external device 2000, when the electronic device 1000 and the external device 2000 form a two-port network circuit.

Figure 9:
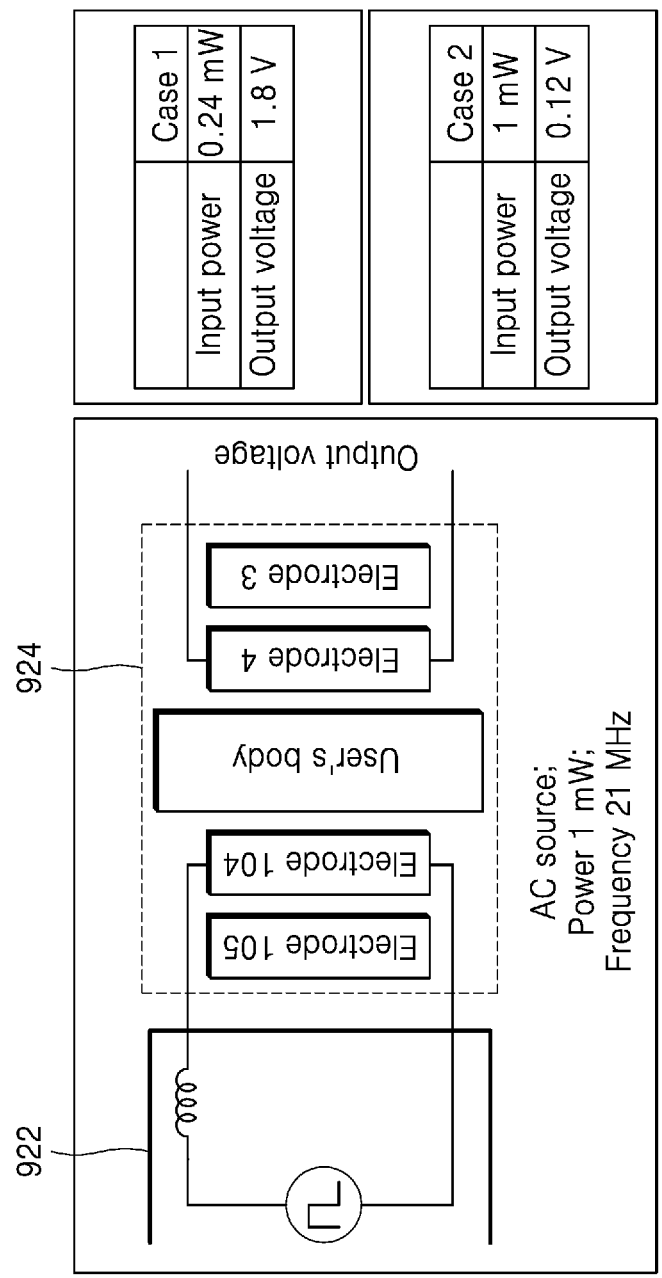
FIG. 9 is a diagram for describing an input power and an output voltage that change with attachment states of an electronic device and an external device, according to the present disclosure.

FIG. 9 is a diagram for describing an input power and an output voltage that change with attachment states of an electronic device and an external device, according to the present disclosure.

The electronic device 1000 using a channel stability circuit including an inductive reactance element and a bridge type driving circuit may perform stable second short-range communication without being affected by impedance that varies with attachment states of the electronic device 1000 and the external device 2000. For example, for comparison with a general electronic device that does not use a channel stability circuit, an input power and an output voltage will be described by modeling the electronic device according to the present disclosure, the external device, and the user's body into the two-port network.

The input power generated in an AC power source of the electronic device according to the present disclosure and delivered to the external device may be set to 1 mW, and a frequency of a signal generated in the AC power source may be set to 21 MHz. When both of the electronic device 1000 according to the present disclosure and the external device 2000 are attached to the user's body (Case 1 420), the input power may be measured as 0.24 mW and an output voltage may be measured as 0.18V. However, when none of the electronic device 1000 according to the present disclosure and the external device 2000 is attached to the user's body (Case 2 440), the input power may be measured as 1 Mw and an output voltage may be measured as 0.12V.

Referring to FIG. 6, the electronic device 1000 including the channel stability circuit according to the present disclosure and the general electronic device not using the channel stability circuit will be compared with each other for description. When none of the electronic device 1000 and the external device 2000 is attached to the user's body (Case 2 440), a ratio of an output voltage with respect to an input power measured in a network circuit including the electronic device 1000 using the channel stability circuit according to the present disclosure is not quite different from a ratio of an output voltage with respect to an input power measured in a network circuit including a general electronic device.

However, when both the electronic device 1000 according to the present disclosure and the external device 2000 are attached to the user's body (Case 1 420), a ratio of an output voltage with respect to an input power measured in a network circuit including the electronic device 1000 using the channel stability circuit according to the present disclosure, 2.3V/1 mW, may be greater than a ratio of an output voltage with respect to an input power measured in a network circuit including a general electronic device, 1.8V/0.24 Mw. That is, when none of the electronic device 1000 according to the present disclosure and the external device 2000 is attached to the user's body (Case 2 440), a difference between performance of the electronic device 1000 and performance of the general electronic device may be small. However, that is, when both of the electronic device 1000 according to the present disclosure and the external device 2000 are attached to the user's body (Case 1 420), a ratio of an output voltage with respect to an input power may be improved when compared to a case using the general electronic device, thereby enhancing performance of data transmission and reception.

Figure 10:
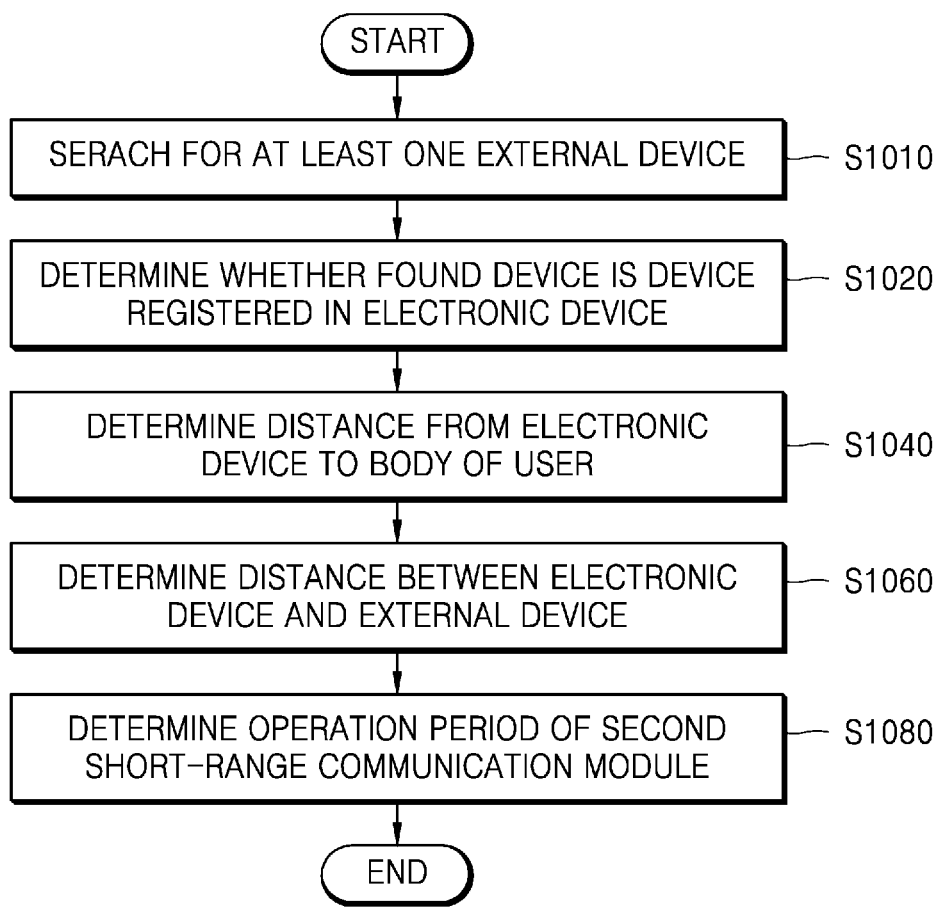
FIG. 10 is a flowchart of a detailed method for activating a second short-range communication channel, according to an embodiment.

FIG. 10 is a flowchart of a detailed method for activating a second short-range communication channel, according to an embodiment.

The electronic device 1000 according to the present disclosure may search for at least one external device connectable with the electronic device by using first short-range communication. The electronic device 1000 according to the present disclosure may determine an operation period of the second short-range communication module based on a search result with respect to at least one external device, and activate the second short-range communication model based on the determined operation period, thereby reducing the power consumption of the second short-range communication module. Referring to FIG. 10, a method for determining the operation period of the second short-range communication module according to the present disclosure will be described in detail.

In operation S1010, the electronic device 1000 may search for at least one external device. For example, the electronic device 1000 may search for at least one external device within a preset communication range by using first short-range communication. According to an embodiment, the preset communication range may be, but not limited to, about 0-2 m.

In operation S1020, the electronic device 1000 may determine whether the found external device is a device previously registered in the electronic device. For example, the electronic device 1000 according to the present disclosure may register information about an external device connected with the electronic device 1000 in the memory of the electronic device 1000. More specifically, the electronic device 1000 according to the present disclosure may store information about the external device 2000 connected with the electronic device 1000 in the memory, and compare information about a currently found external device with the information, stored in the memory, about the external device 2000 connected with the electronic device 1000 to determine whether the currently found external device is the device registered in the electronic device.

In operation S1040, the electronic device 1000 may determine a distance from the electronic device 1000 to the body of the user of the electronic device 1000. For example, the distance from the electronic device to the user's body may include a distance from an electrode module for HBC in the electronic device 1000 to the user's body. According to another embodiment, the distance between the electronic device and the user's body may mean the shortest distance from the electrode module included in the electronic device to the user's body.

In operation S1060, the electronic device 1000 may determine the distance from the electronic device 1000 to the external device. For example, the electronic device 1000 may determine the distance between the electronic device and the external device, based on a strength of a signal received from the external device through first short-range communication. According to an embodiment, the strength of the signal received from the external device through first short-range communication may include a received signal strength indicator (RSSI).

In operation S1080, the electronic device 1000 may determine an operation period of the second short-range communication module. According to another embodiment, the electronic device 1000 may search for at least one external device connectable with the electronic device 1000 by using first short-range communication and determine the operation period of the second short-range communication module based on a search result with respect to the at least one external device.

According to an embodiment, the electronic device 1000 may maintain the second short-range communication module in an inactive state when the at least one external device connectable with the electronic device 1000 is not found by using first short-range communication. Herein, when the electronic device 1000 maintains the second short-range communication module in the inactive state, it may mean that the operation period of the second short-range communication module is set to 0.

According to another embodiment, when the electronic device 1000 has found at least one external device connectable with the electronic device 1000 and the found at least one external device is an external device previously registered in the electronic device 1000, the electronic device 1000 may activate the second short-range communication module in the first operation period. According to an embodiment, the first operation period may be set to, but not limited to, about 0.1%-about 20%, preferably, about 0.5%.

According to another embodiment, when the electronic device 1000 has found at least one external device connectable with the electronic device 1000 and the found at least one external device is an external device that is not registered in the electronic device 1000, the electronic device 1000 may activate the second short-range communication module in the second operation period. According to an embodiment, the second operation period may be set to, but not limited to, about 10%-about 2050%, preferably, about 2%.

That is, the electronic device 1000 according to the present disclosure may determine the operation period of the second short-range communication module, based on at least one of whether external devices connectable with the electronic device are found in a preset communication range or whether the found external devices have been registered in the electronic device.

According to an embodiment, the electronic device 1000 may activate the second short-range communication module in the operation period of the second short-range communication module. According to another embodiment, the electronic device 1000 may activate the second short-range communication module by further using at least one of the distance from the electronic device 1000 to the user's body or the distance from the electronic device 1000 to the external device as well as the determined operation period of the second short-range communication module.

According to another embodiment, the electronic device 1000 may determine the operation period of the second short-range communication module, based on at least one of whether external devices connectable with the electronic device are found in a preset communication range, whether the found external devices have been registered in the electronic device, the distance from the electronic device 1000 to the user's body, or the distance from the electronic device 1000 to the external device, and activate the second short-range communication module according to the determined operation period.

More specifically, the electronic device 1000 may not activate the distance from the electronic device to the user's body and activate the second short-range communication module when the determined distance from the electronic device to the user's body is greater than or equal to a preset threshold value. That is, the electronic device 1000 may activate the second short-range communication module, based on at least one of whether external devices connectable with the electronic device are found in a preset communication range, whether the found external devices have been registered in the electronic device, or the distance from the electronic device to the user's body.

According to another embodiment, the electronic device 1000 may determine the distance between the electronic device and the external device based on the strength of the signal received from the external device through first short-range communication, and may not activate the second short-range communication module when the determined distance between the electronic device and the external device is greater than or equal to the preset threshold value. That is, the electronic device 1000 may activate the second short-range communication module, based on at least one of whether external devices connectable with the electronic device are found in a preset communication range, whether the found external devices have been registered in the electronic device, or the distance from the electronic device to the user's body, determined based on the strength of the signal received from the external device through first short-range communication.

According to another embodiment, the electronic device 1000 may determine the operation period of the second short-range communication module, based on at least one of whether external devices connectable with the electronic device are found in a preset communication range, whether the found external devices have been registered in the electronic device, the distance from the electronic device 1000 to the user's body, or the distance from the electronic device 1000 to the external device, and activate the second short-range communication module according to the determined operation period of the second short-range communication module.

Figure 11:
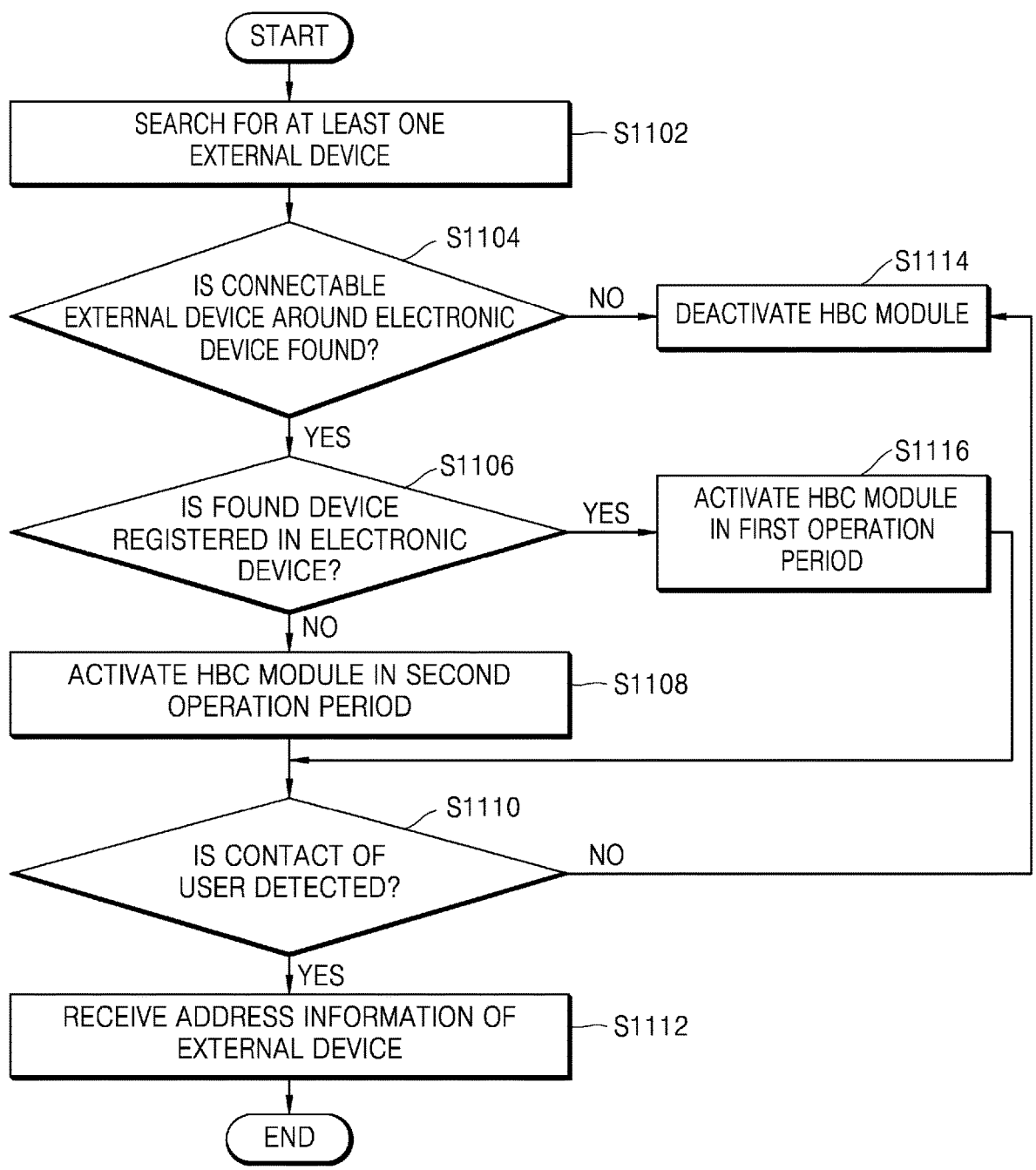
FIG. 11 is a flowchart of a method for determining an operation period of a second short-range communication channel, according to another embodiment.

FIG. 11 is a flowchart of a method for determining an operation period of a second short-range communication channel, according to another embodiment.

In operation S1102, the electronic device 1000 may search for at least one external device. Operation S1102 may correspond to operation S1010 of FIG. 10, and thus will not be described in detail.

In operation S1104, the electronic device 1000 may determine whether a connectable external device around the electronic device is found. For example, the electronic device 1000 may determine whether an external device connectable with the electronic device 1000 within a preset communication range is found using first short-range communication.

In operation S1106, the electronic device 1000 may determine whether the found external device is a device registered in the electronic device. For example, the electronic device 1000 may store information about the external device connected with the electronic device in the memory and compare the information, stored in the memory, about the external device connected with the electronic device with information about a currently found external device to determine whether the currently found external device is the device registered in the electronic device. Operation S1106 may correspond to operation S1020 of FIG. 10.

In operation S1108, the electronic device 1000 may activate the second short-range communication module in the second operation period. According to an embodiment, when the second short-range communication module includes an HBC module, the electronic device 1000 may activate the second short-range communication module in the second operation period. More specifically, when the connectable external device is found in the preset communication range and the found external device is determined as the device previously registered in the electronic device, the electronic device 1000 may activate the second short-range communication module in the second operation period.

In operation S1110, the electronic device 1000 may detect a contact of the user of the electronic device with respect to one of the found at least one external device. For example, upon activation of the second short-range communication module, the electronic device 1000 may detect a contact of the user of the electronic device 1000 with respect to one of the at least one external device by using the activated second short-range communication module.

In operation S1112, when the contact of the user of the electronic device 1000 with respect to one of the at least one external device is detected, the electronic device 1000 may receive address information of the external device from the external device. According to an embodiment, the address information may include pairing information or an RF communication identifier for setting up first short-range communication between the external device and the electronic device.

In operation S1114, when the connectable external device is not found in the preset communication range, the electronic device 1000 may deactivate the second short-range communication module. Herein, when the electronic device 1000 deactivates the second short-range communication module, it may mean that the operation period of the second short-range communication module is set to 0.

In operation S1116, when the connectable external device is found in the preset communication range and the found external device is the device previously registered in the electronic device, the electronic device 1000 may activate the second short-range communication module in the first operation period. According to an embodiment, the second operation period may be greater than the second operation period, without being limited thereto. Herein, the second short-range communication module may include an HBC module for HBC, such that a method for connecting the electronic device to the external device by using the second short-range communication module may be executed using the HBC module.

Figure 12:
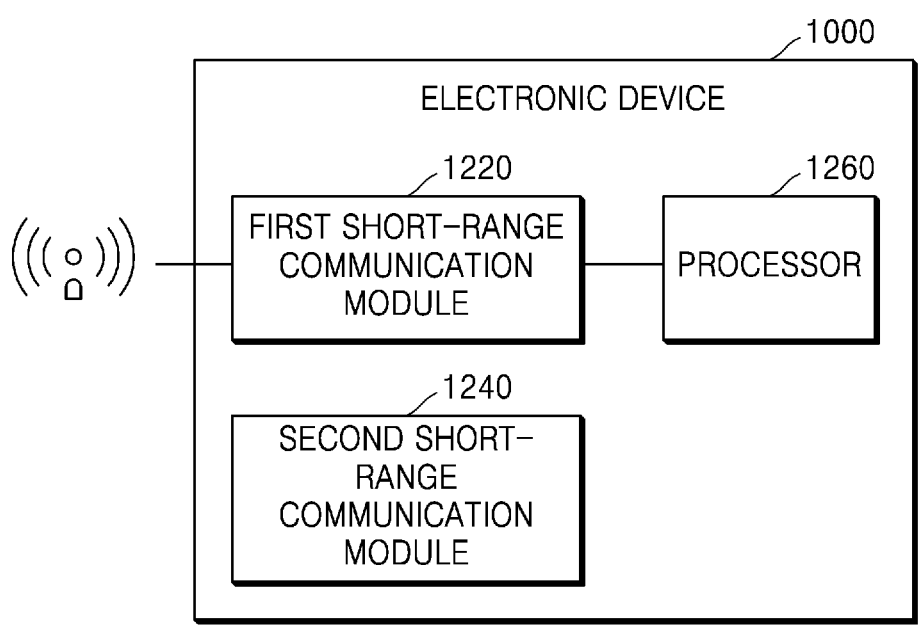
FIG. 12 is a block diagram of an electronic device according to an embodiment.

FIG. 12 is a block diagram of an electronic device according to an embodiment.

The electronic device 1000 according to the present disclosure may include a first short-range communication module 1220, a second short-range communication module 1240, and a processor 1260. However, the shown components are not essential components. The electronic device 1000 may be implemented with a larger or smaller number of elements than the illustrated elements. According to another embodiment, the electronic device 1000 may include a user inputter, a communicator, a sensor, a memory, and an outputter in addition to the first short-range communication module 1220, the second short-range communication module 1240, and the processor 1260.

The electronic device 1000 According to an embodiment may be implemented in various forms. For example, examples of the electronic device 1000 described herein may include, but not limited to, a digital camera, a mobile terminal, a smart phone, a laptop computer, a tablet personal computer (PC), an electronic (e)-book terminal, a digital broadcasting terminal, a personal digital assistant (PDA), a portable multimedia player (PMP), a navigator, an MP3 player, smart appliances operating with each other in a smart home, and the like.

According to another embodiment, the electronic device 1000 may be a wearable device that is wearable on the user. Examples of the wearable device may include, but not limited to, at least one of an accessory type (e.g., a watch, a ring, a wrist band, an ankle band, a necklace, glasses, contact lenses, head-mounted device (HMD), etc.), a fabric or cloth-integrated type (e.g., electronic clothing, etc.), a body-attached type (e.g., a skin pad, etc.), a body implanted type (e.g., an implantable circuit, etc.), or the like.

The first short-range communication module 1220 may perform first short-range communication between the electronic device 1000 and the external device 2000 connected thereto. For example, the first short-range communication module 1220 may search for at least one external device connectable with the electronic device within a preset communication range from the electronic device, under control of the processor 1260. In addition, the first short-range communication module 1220 may transmit and receive data through set first short-range communication when first short-range communication is set up between the electronic device and the external device by using address information received by second short-range communication.

According to an embodiment, when the first short-range communication module is a Bluetooth communication module, the Bluetooth communication module may search for at least one external device connectable with the electronic device, under control of the processor.

The second short-range communication module 1240 may further include a short-range proximity sensor. For example, the second short-range communication module 1240 may perform second short-range communication between the electronic device 1000 and the external device 2000 connected thereto. More specifically, the second short-range communication module 1240 may receive address information of the external device from the external device by performing second short-range communication with the external device, under control of the processor 1260. According to another embodiment, when the second short-range communication module 1240 is activated under control of the processor, the second short-range communication module 1240 may detect a contact of the user of the electronic device with respect to one of the found at least one external device by using second short-range communication. According to another embodiment, the second short-range communication module 1240 may be deactivated after transmission and reception of an HBC signal including address information, under control of the processor 1260.

The processor 1260 may control operations of the first short-range communication module 1220, the second short-range communication module 1240, the user inputter, the communicator, the sensor, and the memory by executing one or more instructions stored in the memory. According to an embodiment, the processor 1260 may control the first short-range communication module to search for at least one external device connectable with the electronic device within a preset communication range through first short-range communication, determine the operation period of the second short-range communication module for performing second short-range communication with the at least one external device based on a search result with respect to the at least one external device, activate the second short-range communication module according to the determined operation period, detect a contact of the user of the electronic device with respect to one of the at least one external device by using the activated second short-range communication module, and receive address information of the external device by performing second short-range communication with the external device upon detecting the user's contact.

According to another embodiment, the processor 1260 may process digital data for an HBC modulation unit and process the digital data received from the HBC modulation unit to set up first short-range communication between the electronic device 1000 and the external device 2000. The first short-range communication module 1220, the second short-range communication module 1240, the user inputter, the communicator, the sensor, the memory, and the display according to the present disclosure may be controlled by a single processor, but may also be controlled by a plurality of processors for controlling at least two of them.

The processor 1260 according to the present disclosure may change the operation period of the second short-range communication module by using at least switching module in changing the operation period of the second short-range communication module.

The memory (not shown) may store programs for processing and control of the processor 1260 and store data input to or output from the electronic device 1000. The memory may further store address information received from the external device by the electronic device 1000 and information about the external device that has ever been connected with the electronic device 1000. The memory may store instructions executed by the electronic device 1000 for controlling the first short-range communication module 1220 and the second short-range communication module 1240 to perform first short-range communication and second short-range communication.

The memory may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth. The programs stored in the memory may be classified into a plurality of modules based on functions thereof, and may be classified into a device control module in the electronic device 1000, an RF communication module for performing RF communication, and an HBC module for performing HBC.

The sensor senses a state of the electronic device 1000 or a state near the electronic device 1000, and delivers sensed information to the processor 1260. The sensor may be used to detect specification information of the electronic device 1000, state information of the electronic device 1000, surrounding environment information of the electronic device 1000, state information of the user of the electronic device, and whether the electronic device is attached on the body of the user of the electronic device.

The sensor may include, but not limited to, at least one of a magnetic sensor, an acceleration sensor, a temperature/humidity sensor, an infrared sensor, a gyroscope sensor, a positioning sensor (e.g., a global positioning system (GPS)), a pressure sensor, a proximity sensor, and a red/green/blue (RGB) sensor (or an illuminance sensor). A function of each sensor may be intuitively construed from a name of each sensor by those of ordinary skill in the art, and thus will not be described in detail.

The user inputter may be a means through which a user inputs data for controlling the electronic device 1000. For example, the user inputter may include, but not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The communication interface may include other communication devices used for the electronic device 1000 to perform data transmission and reception and one or more components used for communication with an external device and a server. The external device may be, but not limited to, a computing device connectable with the electronic device 1000, a sensing device, or a device of the same type as the electronic device. The communication device may be, but not limited to, an electronic device capable of transmitting and receiving data with the electronic device 1000 or a device of the same type as the electronic device.

The display may include a screen and a touch screen for displaying information processed in the electronic device 1000. According to an embodiment, the touch screen may detect a touch gesture of the user of the electronic device and delivers information about the touch gesture to the processor. The touch screen according to some embodiments may recognize and analyze a touch code. The touch screen may be configured with separate hardware including a controller.

Figure 13:
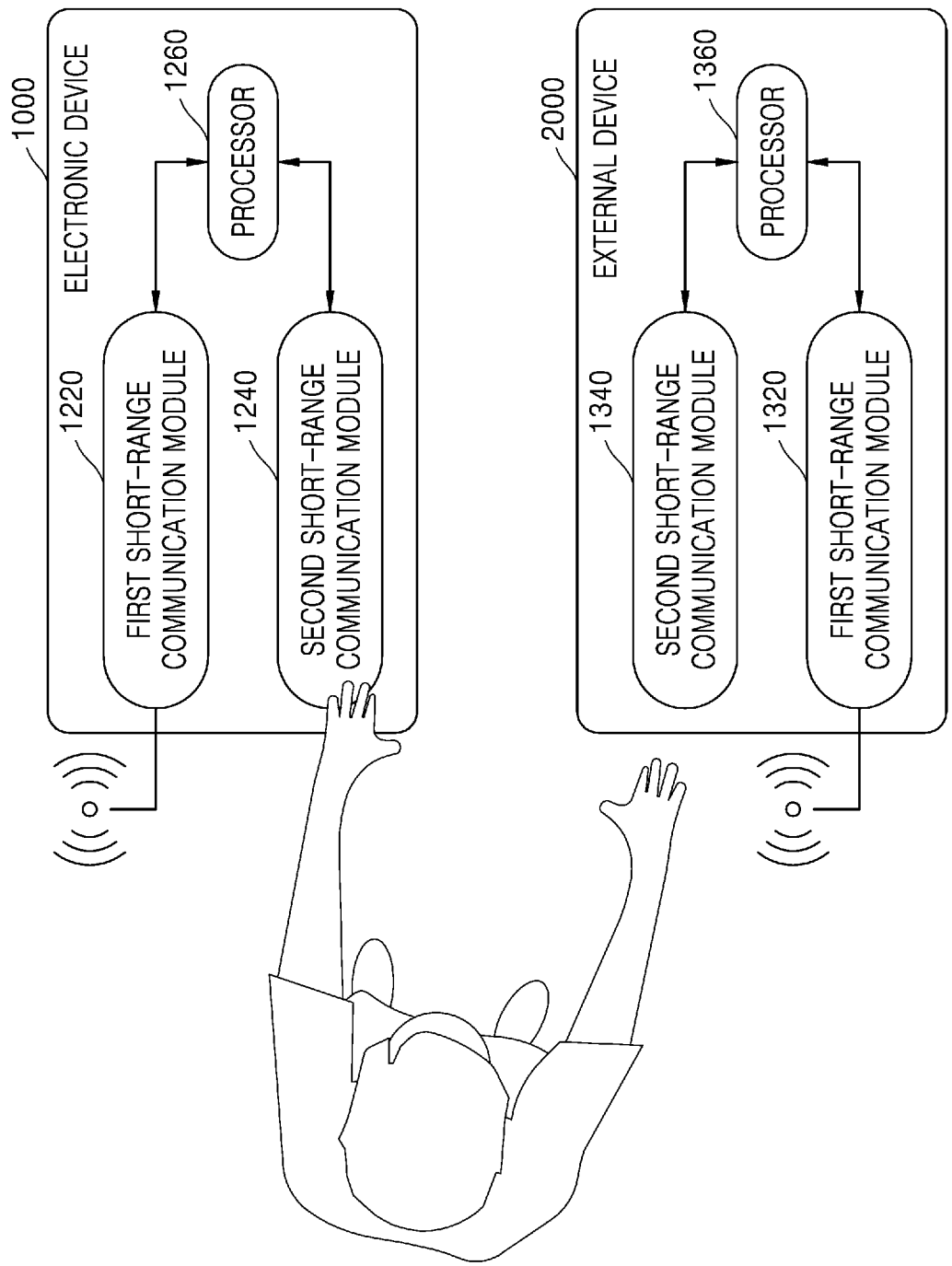
FIG. 13 illustrates block diagrams of an electronic device and an external device, according to an embodiment.

FIG. 13 illustrates block diagrams of an electronic device and an external device, according to an embodiment.

According to an embodiment, the electronic device 1000 may include the first short-range communication module 1220, the second short-range communication module 1240, and the processor 1260. The first short-range communication module 1220, the second short-range communication module 1240, and the processor 1260 included in the electronic device 1000 correspond to the first short-range communication module 1220, the second short-range communication module 1240, and the processor 1260 shown in FIG. 12 and thus will not be described in detail.

According to an embodiment, the external device 2000 may include a first short-range communication module 1320, a second short-range communication module 1340, and a processor 1360. The external device 2000 may receive an address information request from the electronic device 1000 by using second short-range communication and transmit address information to the electronic device by using second short-range communication in response to the received address information request.

According to an embodiment, the first short-range communication module 1320 may perform first short-range communication between the external device and the electronic device 1000 connected thereto. For example, the first short-range communication module 1320 may receive a search request signal from the electronic device connectable with the external device within a preset communication range from the external device and transmit a search request confirm signal to the electronic device 1000 in response to the search request signal received from the electronic device, under control of the processor 1360. According to an embodiment, when the first short-range communication module 1320 is a Bluetooth communication module, the Bluetooth communication module may receive the search request signal from at least one electronic device connectable with the external device and transmit the search request confirm signal to the electronic device 1000 in response to the received search request signal, under control of the processor 1360. In addition, the first short-range communication module 1320 may transmit and receive data through set first short-range communication when first short-range communication is set up between the electronic device and the external device.

According to an embodiment, the second short-range communication module 1340 may further include a short-range proximity sensor. For example, the second short-range communication module 1340 may perform second short-range communication between the external device 2000 and the electronic device 1000 connected thereto. More specifically, the second short-range communication module 1340 may receive the address information request from the electronic device and transmit address information of the external device to the electronic device 1000 through second short-range communication in response to the received address information request, under control of the processor 1360.

According to another embodiment, when the second short-range communication module 1340 is activated under control of the processor 1360, the second short-range communication module 1340 may detect a contact of the user of the electronic device 1000 with respect to the external device. The second short-range communication module 1340 may be deactivated after transmission and reception of an HBC signal including address information, under control of the processor 1360.

Figure 14:
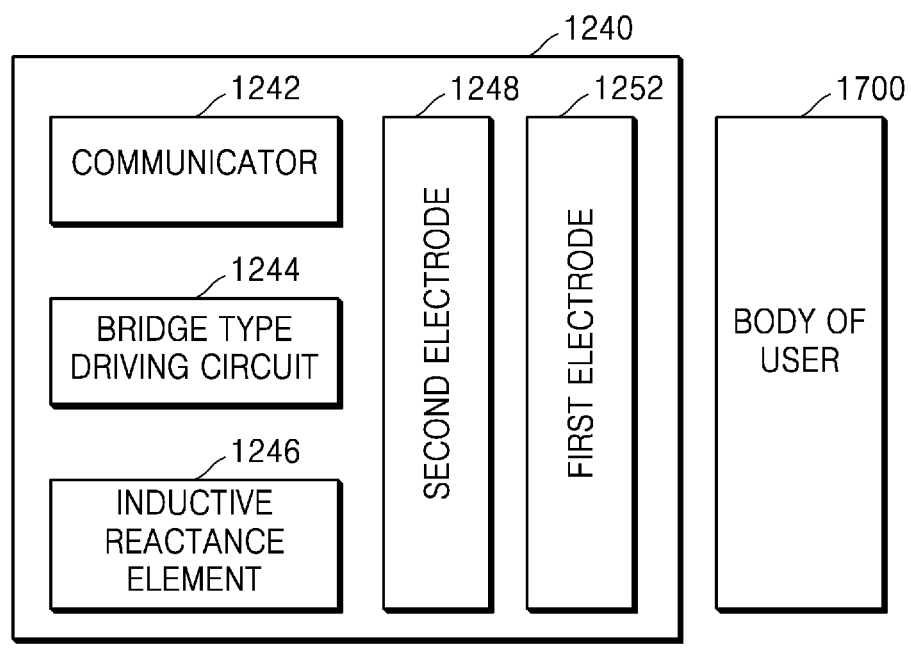
FIG. 14 is a block diagram of a second short-range communication module according to an embodiment.

FIG. 14 is a block diagram of a second short-range communication module according to an embodiment.

The second short-range communication module 1240 according to the present disclosure may include a communicator 1242, a bridge type driving circuit 1244, an inductive reactance element 1246, a first electrode 1252, and a second electrode 1248. However, the shown components are not essential components. The second short-range communication module 1240 may be implemented with less components than the shown components. According to another embodiment, the second short-range communication module 1240 may include the bridge type driving circuit 1244, the inductive reactance element 1246, the first electrode 1252, and the second electrode 1248, except for the communicator 1242.

According to an embodiment, a frequency of a signal used for second short-range communication by the second short-range communication module may fall within, but not limited to, 100 kHz to 21 MHz. According to another embodiment, the frequency of the signal used for second short-range communication by the second short-range communication module may fall within an unlicensed Industry-Science-Medical (ISM) band (a frequency range of industrial, medical, and medical equipment) for a low-power wireless transmission device and may use a 21 MHz carrier frequency in the Institute of Electrical and Electronics Engineers (IEEE) 802.15.6-2012 standards.

According to another embodiment, the second short-range communication module 1240 may be implemented with more components than the shown components. For example, the second short-range communication module 1240 may further include an HBC modulation unit and an HBC demodulation unit in addition to the communicator 1242, the bridge type driving circuit 1244, the inductive reactance element 1246, the first electrode 1252, and the second electrode 1248.

According to an embodiment, the communicator 1242 may receive address information from the external device or transmit an address information request to the external device. The communicator 1242 may deliver the address information received from the external device to the processor 1260 in the electronic device 1000 or receive information for requesting the address information from the processor 1260.

The bridge type driving circuit 1244 may compensate for a path loss of the second short-range communication channel when the electronic device 1000 is not attached to the user's body. For example, the bridge type driving circuit 1244 may compensate for a path loss of the second short-range communication channel by being serially connected with the inductive reactance element 1246, when none of the electronic device 1000 and the external device 2000 is attached to the user's body (Case 2 440). The bridge type driving circuit 1244 of FIG. 14 may correspond to at least one of the half bridge circuit 820 and the full bridge circuit 840 of FIG. 8, and thus will not be described in detail.

The inductive reactance element 1246 may be connected at a side with an electrode mode and at the other side serially with the bridge type driving circuit 1244, thus compensating for a path loss of the second short-range communication channel, when none of the electronic device 1000 and the external device 2000 is attached to the user's body (Case 2 440). According to an embodiment, the inductive reactance element 1246 may be, but not limited to, a pre-fixed reactance (e.g., 14 uH). The channel stability circuit according to the present disclosure may include the bridge type driving circuit 1244 and the inductive reactance element 1246.

According to another embodiment, the inductive reactance element 1246 may form a resonant circuit together with an electrode module including a capacitance between electrodes. For example, the inductive reactance element 1246 according to the present disclosure may resonate together with the electrode module at a preset frequency, thus forming a resonant tank in the electrode device 1000 at the preset frequency.

The first electrode 1252 and the second electrodes 1248 may form a part of the second short-range communication channel and transmit and receive the HBC signal. According to an embodiment, the first electrode may be a signal electrode that transmits or receives a signal for HBC and the second electrode may be a ground electrode. The HBC signal according to the present disclosure may include address information and an RF communication identifier to set up first short-range communication. For example, the first electrode 1252 according to the present disclosure may be connected at a side with a user's body 1700 and at the other side serially with the inductive reactance element 1246, and the second electrode 1248 may be stacked with a predetermined interval from the first electrode 1252 and may be serially connected with the bridge type driving circuit 1244.

According to another embodiment, the first electrode 1252 and the second electrode 1248 may be stacked with the preset interval therebetween, such that the electrode module including the first electrode 1252 and the second electrode 1248 may have a capacitance. Thus, the electrode module according to the present disclosure may form a resonant circuit with the inductive reactance element 1246 at the preset frequency. The structures of the first electrode 1252 and the second electrode 1248 will be described in detail with reference to FIG. 15.

The HBC modulation unit according to the present disclosure may convert digital data received from the processor into an HBC signal, and the second short-range communication module may transmit the HBC signal to at least one connectable external devices. According to an embodiment, the HBC modulation unit may include an HBC modulator.

The HBC demodulation unit may convert the HBC signal including the address information into the digital data, and transmit the digital data including the address information to the processor. The processor according to the present disclosure may process digital data received from the HBC demodulator and transmit a control command to the first short-range communication module, thus controlling the first short-range communication module to set up first short-range communication between the electronic device and at least one external device connectable with the electronic device. According to an embodiment, the HBC demodulation unit may include an HBC demodulator.

Figure 15:
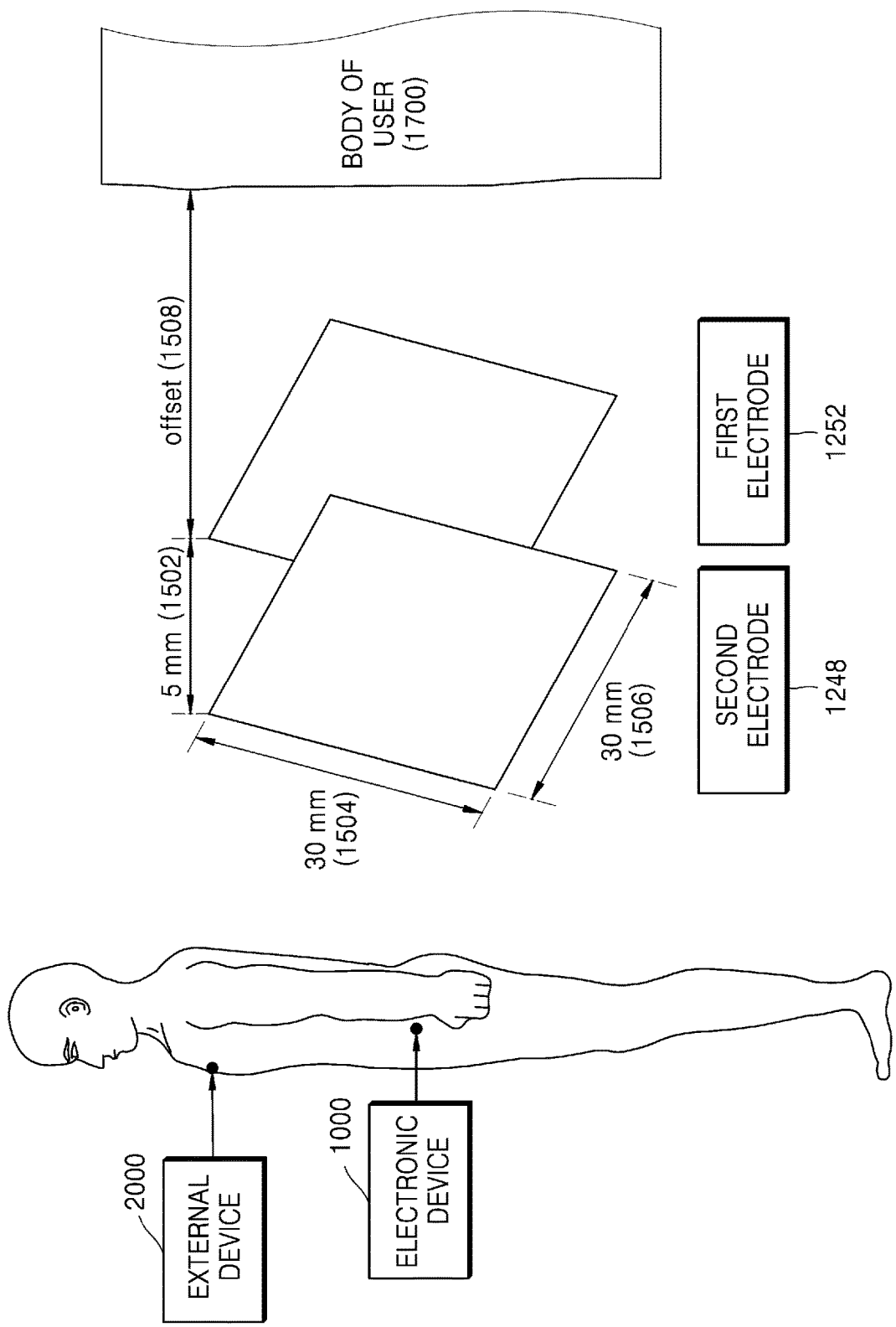
FIG. 15 is a diagram for describing a structure of an electrode module, according to an embodiment.

FIG. 15 is a diagram for describing a structure of an electrode module, according to an embodiment.

The electronic device 1000 and the external device 2000 according to the present disclosure may be attached to the same user or different users by using a plurality of electrodes for second short-range communication. The electronic device 1000 according to an embodiment of the disclosure may include an electrode module including the first electrode 1252 and the second electrode 1248.

For example, the electrode module according to the present disclosure includes the first electrode 1252 attached on a surface thereof to the user's body and the second electrode 1248 stacked with a predetermined interval on the other surface of the first electrode, thus having a predetermined capacitance. The external device 2000 may also include a third electrode and a fourth electrode which may correspond to the first electrode 1252 and the second electrode 1248, respectively.

According to an embodiment, the first electrode 1252 and the second electrode 1248 may be designed to a size of 30 mm (width)×30 mm (length), respectively. The predetermined interval between the first electrode 1252 and the second electrode 1248 may be designed as, but not limited to, about 50 mm. According to the present disclosure, the sizes of the first electrode 1252 and the second electrodes 1248 and the interval between the first electrode 1252 and the second electrode 1248 may be changed.

The impedances of the first electrode 1252 and the second electrode 1248 according to the present disclosure may be different from each other depending on the position of the electrode device 1000 on the user's body, and the second short-range communication channel according to the present disclosure may not guarantee channel stability depending on an electrode impedance changing with the position of the electronic device on the user's body.

Figure 16:
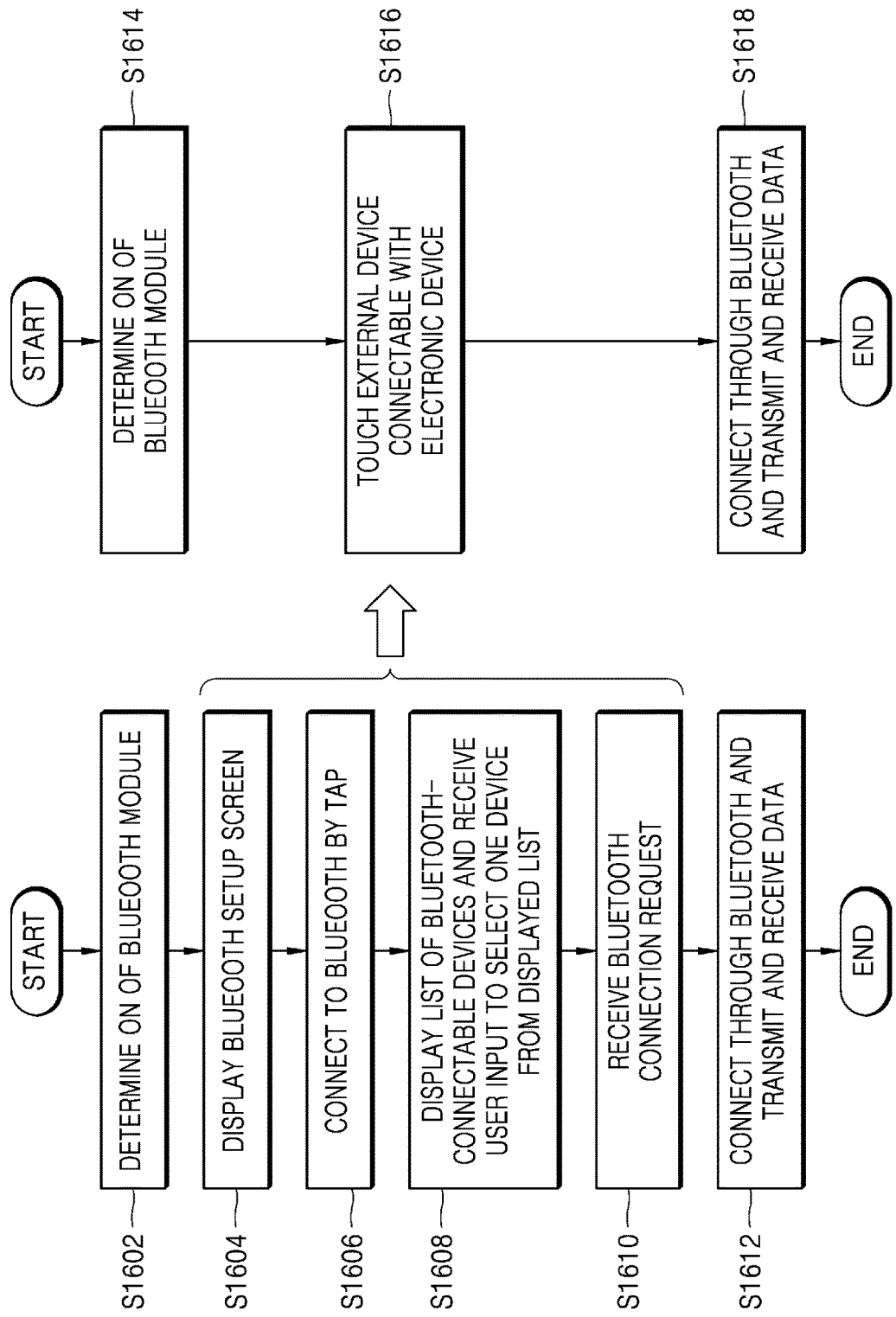
FIG. 16 is a diagram for describing a difference between a method for connecting an electronic device to an external device according to the present disclosure and a method for connecting an electronic device to a general external device.

FIG. 16 is a diagram for describing a difference between a method for connecting an electronic device to an external device according to the present disclosure and a method for connecting an electronic device to a general external device.

The electronic device 1000 according to the present disclosure may be more easily connected with the external device 2000 than a general electronic device, by using second short-range communication. Hereinbelow, a description will be made using Bluetooth communication as an example of first short-range communication and HBC as an example of second short-range communication. First, a method of connecting a general electronic device to an external device will be described.

For example, in operation S1602, the general electronic device may determine whether a Bluetooth communication module is activated in the general electronic device. In operation S1604, the general electronic device may generate a Bluetooth communication setup screen and provide the generated Bluetooth communication setup screen to the display.

In operation S1606, the general electronic device may receive a user's touch input to tap the Bluetooth setup screen. In operation S1608, the general electronic device may display a list of Bluetooth-connectable external devices and receive a user's input to select an external device from the displayed list of the Bluetooth-connectable external devices.

In operation S1610, the general electronic device may perform a pairing process for Bluetooth connection with the external device based on the user's input to select an external device from the displayed list of the Bluetooth-connectable external devices, and transmit and receive data to and from the external device upon completion of the pairing process.

However, the method of connecting the electronic device to the external device according to the present disclosure may include the following operations time-serially performed by the electronic device 1000.

In operation S1614, the electronic device 1000 may determine whether the Bluetooth module is activated. In operation S1616, the electronic device 1000 may detect a contact (e.g., a touch input) of the user to select an external device from at least one external device connectable with the electronic device.

In operation S1618, upon detecting a user's contact with respect to one of the at least one external device connectable with the electronic device, the electronic device 1000 may receive address information for setting up Bluetooth communication through HBC and perform the pairing process for Bluetooth connection by using the received address information. The electronic device according to the present disclosure may transmit and receive data to and from the external device upon completion of the pairing process.

Figure 17:
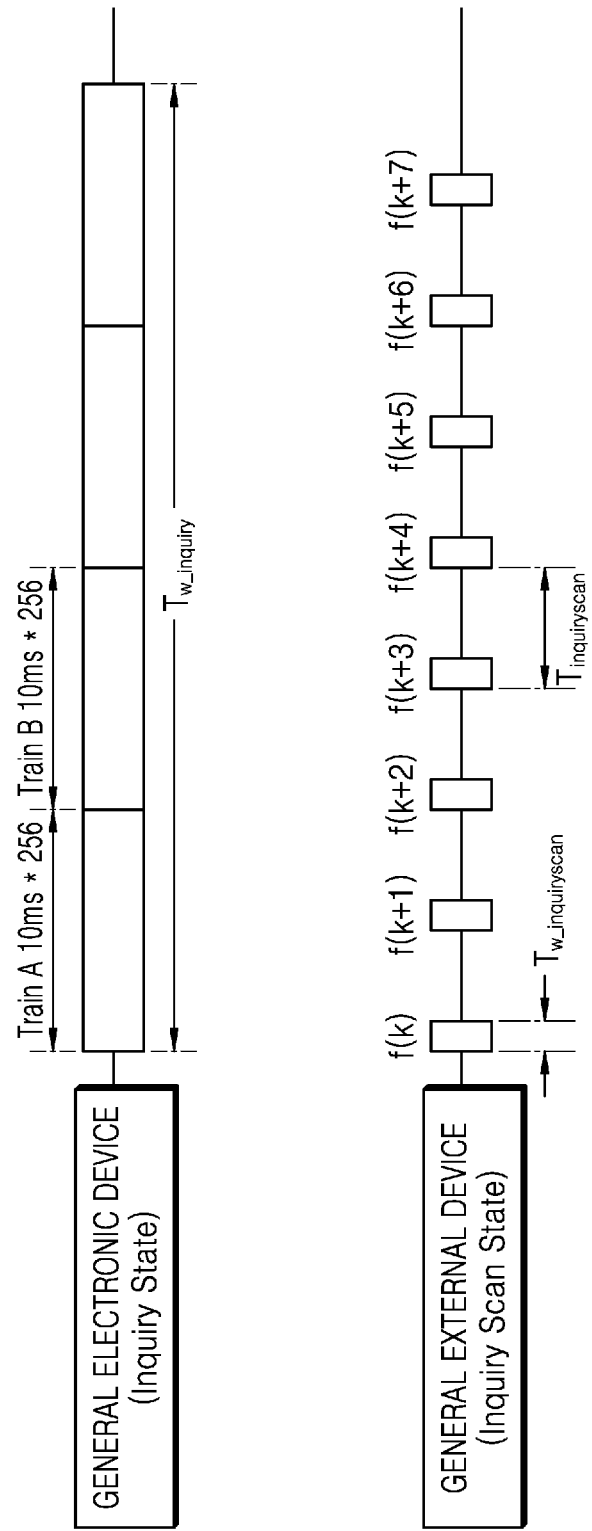
FIG. 17 is a diagram for describing a pairing process performed between a general electronic device and a general external device, according to an embodiment.
Figure 18:
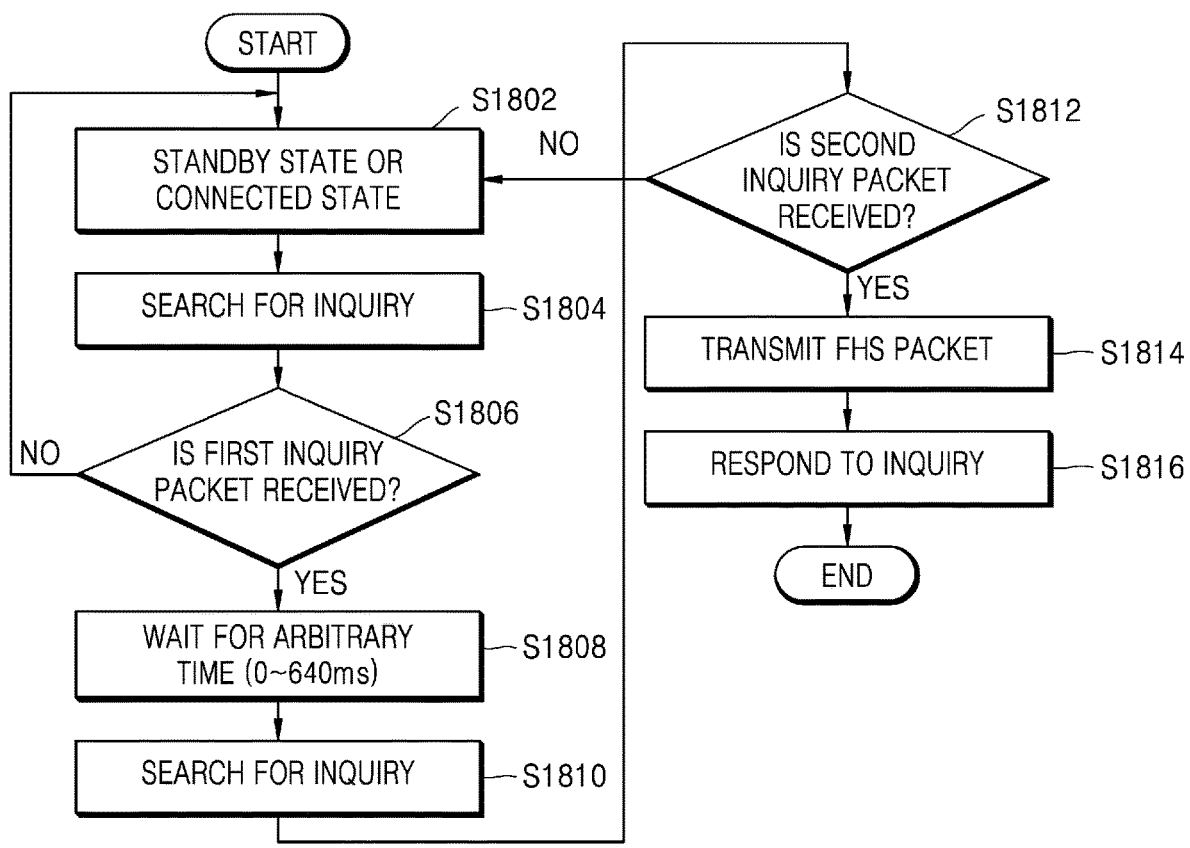
FIG. 18 is a flowchart of a pairing process performed between a general electronic device and a general external device, according to an embodiment.

FIGS. 17 and 18 are diagrams for describing a pairing process performed between a general electronic device and a general external device, according to an embodiment.

Referring to FIGS. 17 and 18, the general electronic device and the external device may periodically transmit and receive data according to a preset timing to perform pairing. For example, the general electronic device may transmit an inquiry packet including an inquiry message to the external device in a period of $T_{w\_inquiry}$ in an inquiry state for pairing with the external device. The general external device may scan in a period of $T_{inquiryscan}$ in an inquiry scan state whether the inquiry message is received. This will be described with reference to FIG. 18.

In operation S1802, the general external device may enter a standby state or a connected state for performing pairing. In operation S1804, the general external device may search for the inquiry packet transmitted from the general electronic device.

In operation S1806, the general external device may determine based on an inquiry packet search result whether a first inquiry packet is received. According to an embodiment, when the inquiry packet is not received, the general external device may re-enter the standby state or the connected state of operation S1802.

When the general external device determines that the first inquiry packet is received in operation S1806, the general external device may wait for an arbitrary time. Thus, it may be possible to prevent a collision problem that may occur when general external devices in the inquiry scan state respond to inquiry packets received from a plurality of electronic devices without waiting.

In operation S1810, the general external device may search for the inquiry packet transmitted from the general electronic device. In operation S1812, the general external device may determine whether a second inquiry packet is received. When the second inquiry packet is not received in operation S1812, the general external device may re-enter the standby state or the connected state of operation S1802.

In operation S1814, when the general external device receives the second inquiry packet, the general external device may transmit a frequency hopping state (FHS) message to the electronic device having transmitted the second inquiry packet. In operation S1816, the general external device may complete the pairing process by responding to an inquiry received in response to transmission of the FHS message.

A method for pairing performed between the general electronic device and the general external device, shown in FIGS. 17 and 18, is similarly applied to an HBC process performed between the general electronic device and the general external device. Thus, when HBC is performed between the general electronic device and the external device, the general electronic device and the external device consume much power to maintain the inquiry state and the inquiry scan state.

However, the electronic device 1000 according to the present disclosure may largely reduce power consumption because of using first short-range communication and second short-range communication activated in association with first short-range communication according to a predetermined operating period.

Figure 19:
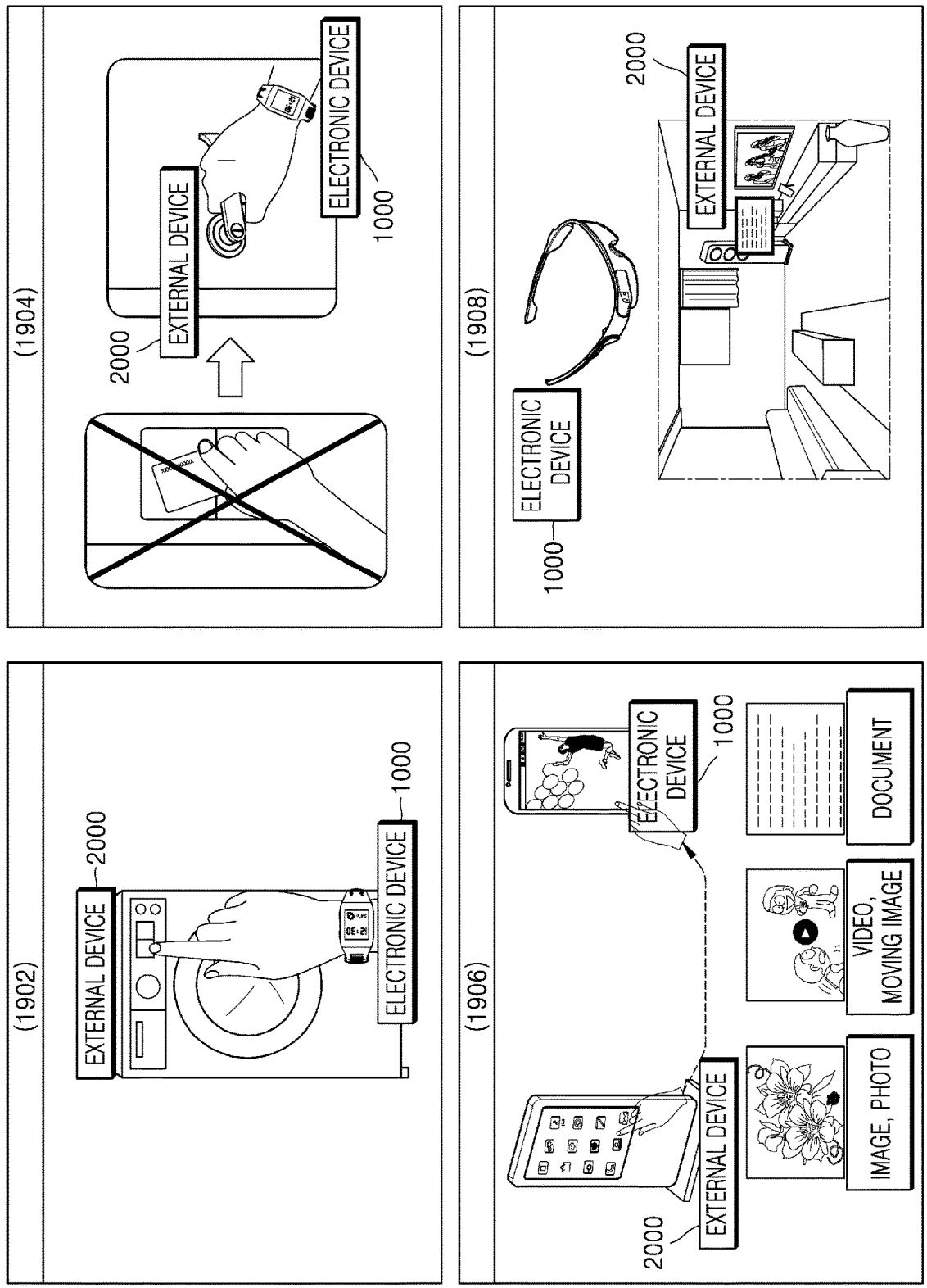
FIG. 19 is a diagram for describing examples of an electronic device connected to an external device, according to an embodiment.

FIG. 19 is a diagram for describing examples of an electronic device connected to an external device, according to an embodiment.

According to an embodiment, the electronic device 1000 according to the present disclosure may be worn on a part of the body of the user and the external device 2000 according to the present disclosure may be worn on the part of the body of the user or a another part of the body of the user. According to another embodiment, the electronic device 1000 according to the present disclosure may be worn on the part of the body of the user and the external device 2000 may not be worn on the body (for example, the external device is fixed to an info panel, a kiosk, etc.). According to another embodiment, none of the electronic device 1000 and the external device 2000 may be worn on the body (for example, the electronic device according to the present disclosure and the external device are fixed to an info panel, a kiosk, etc.).

According to another embodiment, the electronic device 1000 according to the present disclosure and the external device 2000 may be embedded in other electronic devices worn on the user's body. In this case, the electronic device 1000 according to the present disclosure may be located in different positions on the user's body, such as pants, a shirt, a jacket, a wrist, a head, etc. Thus, the electronic device 1000 according to the present disclosure may contact the user's body or may be within a distance of a maximum of 3 cm from the user's body, and in this case, the second short-range communication module may provide stable second short-range communication regardless of the position of the electronic devices 100.

The electronic device 1000 according to the present disclosure and the external device 2000 may use the user's body as at least a part of a second short-range communication channel. According to an example 1902, the electronic device 1000 according to the present disclosure may be worn on the user's wrist, and the external device 2000 may be fixed to a home appliance at home. When the user of the electronic device 1000 according to the present disclosure touches a home appliance in which the external device 2000 is fixed, first short-range communication may be set up between the external device 2000 in the home appliance and the electronic device 1000.

According to another example 1904, the electronic device 1000 according to the present disclosure may be worn on the user's wrist, and the external device 2000 may be fixed to a door of a building, a door of an indoor room, a door of a home appliance, etc. When the user of the electronic device 1000 according to the present disclosure touches a door in which the external device 2000 is fixed (e.g., the user holds a door handle), authentication may be performed with respect to the user of the electronic device 1000 by using first short-range communication that is set up between the electronic device 1000 and the external device 2000.

That is, when the electronic device 1000 according to the present disclosure and the external device 2000 are used, the user of the electronic device 1000 may open the door by simply performing authentication without using a separate pass. According to another embodiment, when the user of the electronic device 1000 according to the present disclosure touches a door in which the external device 2000 is fixed (e.g., the user holds a door handle), authentication may be performed with respect to the user of the electronic device 1000 by using second short-range communication that is set up between the electronic device 1000 and the external device 2000. First short-range communication described herein may include RF communication, and second short-range communication may include HBC, as described above.

According to another example 1906, the electronic device 1000 according to the present disclosure may be carried by the user, and the external device 2000 may be fixed to an external info panel or kiosk instead of a human body. When the user carrying the electronic device 1000 according to the present disclosure touches an info panel in which the external device 2000 is fixed, first short-range communication may be set up between the electronic device 1000 and the external device 2000 and may receive data such as an image, video, and a document from the info panel in which the external device 2000 is fixed, by using first short-range communication. When first short-range communication is set up, the electronic device 1000 may transmit data such as an image, video, and a document to the info panel in which the external device 2000 is fixed.

According to another example 1908, the electronic device 1000 according to the present disclosure may be fixed to glasses in which augmented reality (AR) and virtual reality (VR) are implemented, and the external device 2000 may be fixed to objects for AR and VR contents by interworking with the electronic device 1000. When the user wearing the electronic device 1000 according to the present disclosure touches objects capable of providing AR and VR contents in which the external device 2000 is fixed, first short-range communication may be set up between the objects and the electronic device 1000.

Figure 20:
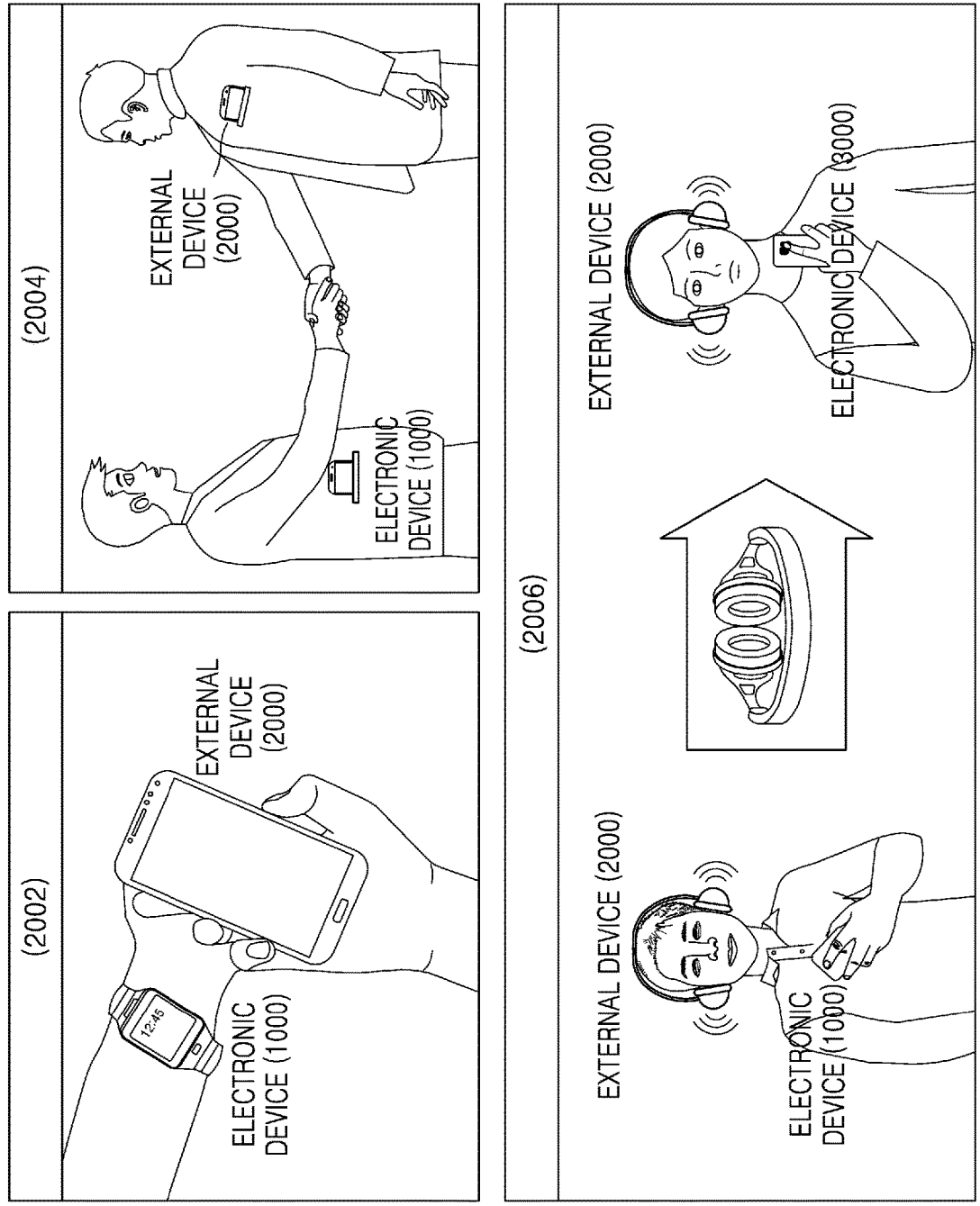
FIG. 20 is a diagram for describing examples of an electronic device connected to an external device, according to another embodiment.

FIG. 20 is a diagram for describing examples of an electronic device connected to an external device, according to another embodiment.

According to an example 2002, the electronic device 1000 according to the present disclosure may be worn on the user's wrist, and the external device 2000 may be placed on a hand of the user. When the user wearing the electronic device 1000 according to the present disclosure holds the external device 2000 by hand, locking of the external device 2000 may be released using first short-range communication that is set up between the external device 2000 and the electronic device 1000. When the user wearing the electronic device 1000 according to the present disclosure holds the external device 2000 by hand, locking of the external device 2000 may be released using second short-range communication that is set up between the external device 2000 and the electronic device 1000.

According to another example 2004, the electronic device 1000 according to the present disclosure and the external device 2000 may be located in different users. For example, when the user carrying the electronic device 1000 according to the present disclosure and the user carrying the external device 2000 according to the present disclosure shake hands, first short-range communication may be set up between the electronic device 1000 and the external device 2000 and data may be transmitted and received through set first short-range communication.

According to another example 2006, the electronic device 1000 including the first short-range communication module and the second short-range communication module according to the present disclosure and the external device 2000 may be carried by the same user, and first short-range communication therebetween may be set up using a method of connecting the electronic device to the external device according to the present disclosure. In a state where first short-range communication is set up between the electronic device 1000 and the external device 2000, when the external device 2000 is delivered to a user using another electronic device 3000, the electronic device 3000 may set up first short-range communication between the electronic device 3000 and the external device 2000 based on a touch of the user of the electronic device 3000 and the user of the electronic device 3000 may use the external device 2000 without performing a separate pairing process.

Figure 21:
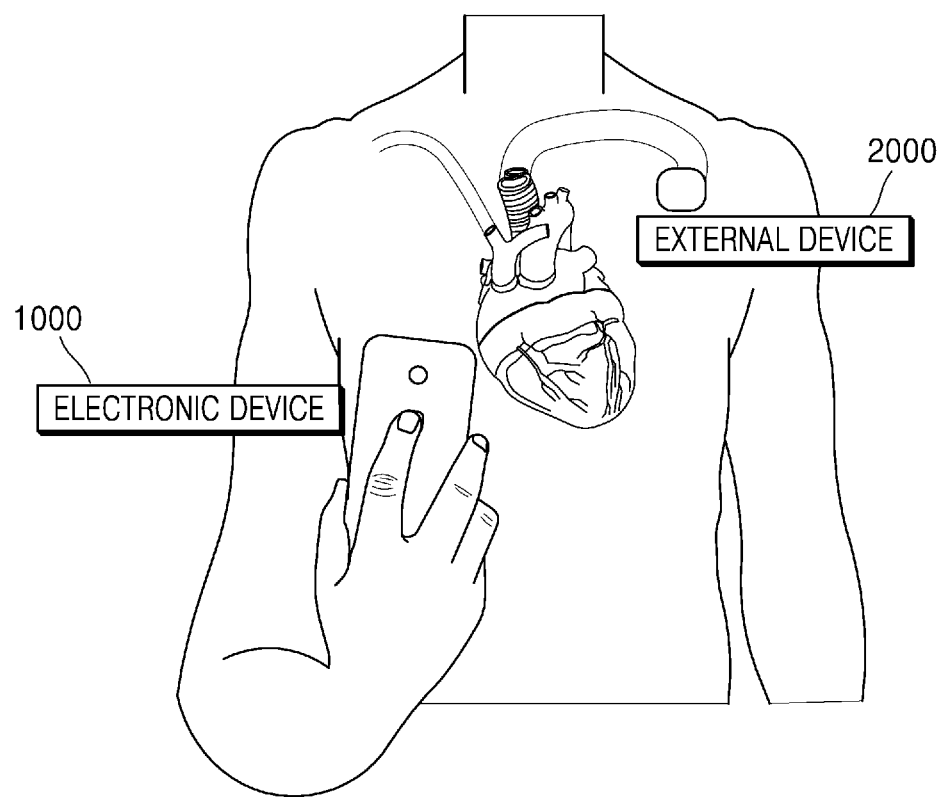
FIG. 21 is a diagram for describing a specific absorption rate (SAR) of an electronic device, according to an embodiment.

FIG. 21 is a diagram for describing a specific absorption rate (SAR) of an electronic device, according to an embodiment.

The electronic device 1000 according to the present disclosure may be designed to have a lower output power than radiation of the electronic device 1000 using a general mobile or Bluetooth module. Thus, the SAR of the electronic device 1000 according to the present disclosure may be lower than an electronic device or a mobile device using a general Bluetooth module and thus may be safe for a human body.

According to an example, the SAR of the electronic device 1000 according to the present disclosure may be designed as, but not limited to, about 9.9E–7 W/Kg. The electronic device 1000 according to the present disclosure may be inserted into a pace maker based on low SAR characteristics, thus stably transmitting and receiving information about heartbeat to and from the external device.

The methods according to the embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program instructions include a machine language code created by a complier and a high-level language code executable by a computer using an interpreter.

Some embodiments of the disclosure may be implemented with a recording medium including a computer-executable instruction such as a computer-executable programming module. A computer-readable recording medium may be an available medium that is accessible by a computer, and includes all of a volatile medium, a non-volatile medium, a separated medium, and a non-separated medium. The computer-readable recording medium may also include both a computer storage medium and a communication medium. The computer storage medium includes all of a volatile medium, a non-volatile medium, a separated medium, and a non-separated medium, which is implemented by a method or technique for storing information such as a computer-readable instruction, a data structure, a programming module, or other data. The communication medium includes a computer-readable instruction, a data structure, a programming module, or other data of a modulated data signal like carriers, or other transmission mechanisms, and includes an information delivery medium. Some embodiments may be implemented by a computer program including a computer-executable instruction such as a computer program executed by a computer, or a computer program product.

While the present disclosure has been shown and described with reference to certain example embodiments thereof, the scope of the present disclosure is not limited to the description and also includes various modifications and improvements made by those of ordinary skill in the art using the concept of the present disclosure defined in the appended claims.

The invention claimed is:
1. A method comprising:
searching for at least one external device connectable with an electronic device within a preset communication range by using first short-range communication;
determining an operation period of a second short-range communication module for performing second short-range communication with the at least one external device, based on a search result with respect to the at least one external device;
activating the second short-range communication module according to the determined operation period and detecting a contact of a user of the electronic device with respect to an external device among the at least one external device by using the activated second short-range communication module; and
receiving address information of the external device by performing second short-range communication with the external device, upon detecting the contact of the user.

2. The method of claim 1,
wherein the address information comprises pairing information for setting up the first short-range communication between the electronic device and the external device, and
wherein the method further comprises pairing with the external device by using the received address information.

3. The method of claim 1, wherein the receiving of the address information comprises:
forming a second short-range communication channel according to a channel parameter determined based on at least one of a position of the electronic device on a body of the user of the electronic device or a distance between the electronic device and the body of the user; and
receiving the address information from the external device through the formed second short-range communication channel.

4. The method of claim 1,
wherein the first short-range communication comprises at least one of Bluetooth, Bluetooth Low Energy (BLE), ZigBee, or Wireless Fidelity (Wi-Fi), and
wherein the second short-range communication comprises human body communication (HBC).

5. The method of claim 1, wherein the operation period indicates a ratio of an active state of the second short-range communication module to an inactive state of the second short-range communication module.

6. The method of claim 1, wherein the determining of the operation period comprises:
maintaining the second short-range communication module in an inactive state when the at least one external device is not found;
activating the second short-range communication module in a first operation period when the at least one external device is found; and
activating the second short-range communication module in a second operation period when the at least one external device is found and the found at least one external device is not registered in the electronic device.

7. The method of claim 3,
wherein the electronic device is worn on a part of the body of the user, wherein the external device is worn on the part of the body of the user or another part of the body of the user, and wherein the electronic device and the external device use the body of the user as at least a part of the second short-range communication channel.

8. The method of claim 1, further comprising determining a distance from the electronic device to the body of the user, wherein the second short-range communication module is activated based on the determined operation period and the determined distance.

9. The method of claim 1, further comprising:

determining a distance between the electronic device and the external device based on a strength of a signal received from the external device through the first short-range communication, wherein the second short-range communication module is activated based on the determined operation period and the determined distance between the electronic device and the external device.

10. The method of claim 3, wherein the second short-range communication module comprises an electrode module, which comprises a first electrode attached to the body of the user and a second electrode stacked on the first electrode with a predetermined interval from the first electrode, and an inductive reactance element serially connected with the first electrode, and wherein the electrode module and the inductive reactance element resonate at a preset frequency.

11. The method of claim 10, wherein the second short-range communication module further comprises a bridge type driving circuit serially connected with another side of the inductive reactance element to compensate for a path loss of the second short-range communication channel, when the electrode module is not attached to the body of the user.

12. An electronic device connected with an external device, the electronic device comprising:

a first short-range communication module configured to perform first short-range communication with the external device;

a second short-range communication module configured to perform second short-range communication with the external device;

at least one memory storing one or more instructions; and at least one processor configured to execute the one or more instructions, wherein the at least one processor, by executing the one or more instructions, is configured to:

search for at least one external device connectable with the electronic device within a preset communication range by using the first short-range communication;

determine an operation period of the second short-range communication module for performing second short-range communication with the at least one external device, based on a search result with respect to the at least one external device;

activate the second short-range communication module according to the determined operation period and detect a contact of a user of the electronic device with respect to an external device among the at least one external device by using the activated second short-range communication module; and receive address information of the external device by performing second short-range communication with the external device, upon detecting the contact of the user.

13. The electronic device of claim 12, wherein the address information comprises pairing information for setting up the first short-range communication between the electronic device and the external device, and wherein the at least one processor is further configured to perform pairing with the external device to set up the first short-range communication by using the received address information.

14. The electronic device of claim 12, wherein the at least one processor is further configured to:

maintain the second short-range communication module in an inactive state when the at least one external device is not found;

activate the second short-range communication module in a first operation period when the at least one external device is found; and activate the second short-range communication module in a second operation period when the at least one external device is found and the found at least one external device is not registered in the electronic device.

15. A non-transitory computer program product comprising a recording medium having stored therein a program for performing operations of: searching for at least one external device connectable with an electronic device within a preset communication range by using first short-range communication; determining an operation period of a second short-range communication module for performing second short-range communication with the at least one external device, based on a search result with respect to the at least one external device; activating the second short-range communication module according to the determined operation period and detecting a contact of a user of the electronic device with respect to an external device among the at least one external device by using the activated second short-range communication module; and receiving address information of the external device by performing second short-range communication with the external device, upon detecting the contact of the user.

* * * * *